(12) United States Patent
Markovic

(10) Patent No.: US 8,468,491 B2
(45) Date of Patent: Jun. 18, 2013

(54) SYSTEMS AND METHODS FOR INTEGRATING PROCESS PERSPECTIVES AND ABSTRACTION LEVELS INTO PROCESS MODELING

(75) Inventor: Ivan Markovic, Karlsruhe (DE)

(73) Assignee: SAP AG, Walldorf (DE)

( * ) Notice: Subject to any disclaimer, the term of this patent is extended or adjusted under 35 U.S.C. 154(b) by 993 days.

(21) Appl. No.: 12/511,847

(22) Filed: Jul. 29, 2009

(65) Prior Publication Data

US 2011/0029947 A1 Feb. 3, 2011

(51) Int. Cl.
*G06F 9/44* (2006.01)

(52) U.S. Cl.
USPC .......................................... 717/102; 705/7.25

(58) Field of Classification Search
None
See application file for complete search history.

(56) References Cited

U.S. PATENT DOCUMENTS

| | | | | |
|---|---|---|---|---|
| 8,073,801 | B1 * | 12/2011 | Von Halle et al. | 706/47 |
| 8,140,362 | B2 * | 3/2012 | Deshpande et al. | 705/7.11 |
| 2004/0176968 | A1 * | 9/2004 | Syed et al. | 705/1 |
| 2007/0179822 | A1 * | 8/2007 | Benayon et al. | 705/7 |
| 2007/0239570 | A1 * | 10/2007 | Kam-Chak Cheng et al. | 705/35 |
| 2008/0183562 | A1 * | 7/2008 | Ramachandran et al. | 705/10 |

OTHER PUBLICATIONS

Dreling, Alexander, et al., "From Conceptual Process Models to Running Workflows: A Holistic Approach for the Configuration of Enterprise Systems", [Online]. Retrieved from the Interent: <URL: http://www.pacis-net.org/file/2005/298.pdf>, 14 pgs.

Hassan, Wael, et al., "Process Model for Access Control", [Online]. Retreived from the Internet: <URL: http://lotos.site.uottawa.ca/ncac05/hassan_18500293.ppt>, 29 pgs.

Wolter, Christian, et al., "Deriving XACML Policies from Business Process Models", Wise 2007 Workshops, LCNS 4832, (2007), 142-153.

* cited by examiner

*Primary Examiner* — Elias Mamo
(74) *Attorney, Agent, or Firm* — Schwegman Lundberg & Woessner, P.A.

(57) ABSTRACT

Methods and systems for integrating process perspectives and abstraction levels into business process modeling are described. In one example embodiment, modeling business processes for an enterprise can include selecting a segmented view of an enterprise meta-model. The segmented view is associated with a business process to be modeled. The enterprise meta-model is a machine-readable representation of business rules and policies for the enterprise. A business process model is created using a set of visual modeling tools, which are limited by the segmented view. A business policy having some relevance to the process being modeled can be selected for annotation to the business process. Once completed, the business process model is transformed into a machine-readable representation and stored in a repository.

21 Claims, 22 Drawing Sheets

SYSTEMS AND METHODS FOR INTEGRATING PROCESS PERSPECTIVES AND ABSTRACTION LEVELS INTO PROCESS MODELING

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2009, SAP AG. All Rights Reserved.

TECHNICAL FIELD

Various embodiments relate generally to the field of business process modeling, and in particular, but not by way of limitation, to a system and method for integrating process perspectives and abstraction levels into process modeling.

BACKGROUND

Business process modeling is intended to represent the real-world processes of an enterprise on paper or within a computer system. Business process modeling is typically performed to analyze and improve current enterprise processes. Managers and business analysts seeking to improve process efficiency and quality will often turn to business process modeling as a method to achieve the desired improvements. However, business process modeling can be time consuming and complex, especially when modeling a large enterprise.

In the 1990s, the vision of a process enterprise was introduced to achieve a holistic view of an enterprise, with business processes as the main instrument for organizing the operations of an enterprise. Process orientation meant viewing an organization as a network or system of business processes. The innumerable benefits of investing in business process techniques were demonstrated in efficiency, increased transparency, productivity, cost reduction, quality, faster results, standardization, and, above all, in the encouragement of innovation, leading to competitive advantage and client satisfaction.

Process orientation considered information technology (IT) as a key enabler and thus followed with the introduction of process aware information systems (PAIS) as means to support the knowledge workers in performing business processes. PAIS are driven by explicit process models, which enable a better understanding of business processes, facilitate communication between business analysts and IT experts and serve as a basis for the management and execution of business processes.

While PAIS has provided great benefits, the task of process modeling is still time consuming, complex, and typically requires a high level of technical and business process knowledge.

BRIEF DESCRIPTION OF THE DRAWINGS

Some embodiments are illustrated by way of example and not limitation in the figures of the accompanying drawings in which.

DETAILED DESCRIPTION

Disclosed herein are various embodiments of the present invention for providing methods and systems for integrating multiple process perspectives and abstraction levels into business process modeling.

There are several issues contributing to the fact that design of process models remains a complex task. First, a broad knowledge of an enterprise across multiple functions and levels is often required when designing a process model. This knowledge can be scattered in various business documents, presentations, and people throughout the enterprise, making it difficult to access and reuse. Second, current process modeling approaches do not adequately support process perspectives (e.g., motivational, resource, functional, etc.). One of the ways to reduce modeling complexity is to provide separate process modeling perspectives, which allow the modeler to model only the desired aspect of the process. Organizing and modeling process information through process-oriented views (perspectives) of the enterprise can be more intuitive and easier to understand, analyze, and navigate. Process perspectives can also be used to navigate through a process landscape. Third, current tools provide no support for "abstraction levels," which can enable different stakeholders within an organization to have unique views on a process model by filtering out irrelevant information depending on their role. For example, an executive might want to see how a process relates to the enterprise goals and strategies she is responsible for delivering. Through an abstraction level, the executive can focus on a process's key performance indicators (KPI) and how well is it performing. The executive may not be interested in detailed process flows, information systems supporting the processes, business objects manipulated by the processes, or other details that may be key to other parts of the organization. Similarly, a business manager may be primarily interested in how a particular process contributes to a broader business scenario, who is responsible for the process, and who is involved in the process. Specialized modeling tools may be able to provide different stakeholders some of the information they need, but these tools are not based on a holistic, unified meta-model. A unified meta-model can overcome many problems with respect to information integration, redundancies, traceability and communication between different abstraction levels, as well as between process perspectives. Other issues may also exist that contribute to the fact that design of process models remains a complex task.

By integrating semantic web technologies into a framework designed for business process modeling, process perspectives and abstraction levels can be provided to reduce the inherent complexity in business process modeling. The semantic web technologies can provide an underlying ontology that can be used to define an enterprise meta-model.

Process Perspectives

Figure 1:
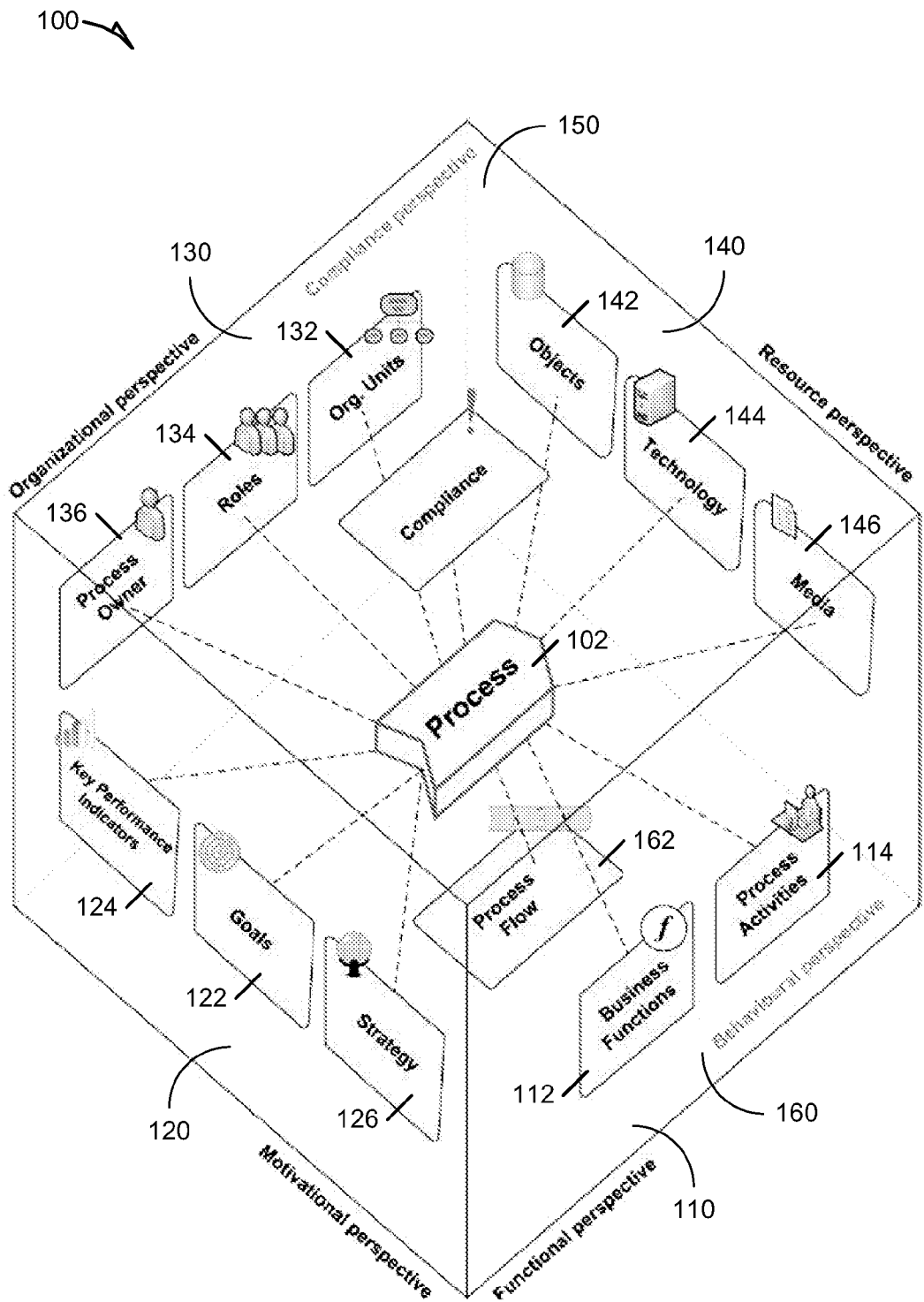
FIG. 1 is a block diagram illustrating six process perspectives, according to an example embodiment.

FIG. 1 is a block diagram illustrating six process perspectives 100, according to an example embodiment. The process perspectives 100 include a functional perspective 110, a motivational perspective 120, a organizational perspective 130, a resource perspective 140, a compliance perspective 150, and a behavioural perspective 160. The process perspectives are visualized in FIG. 1 as orthographic projections, such as those used in mechanical and physical engineering disciplines to create detailed drawings of physical objects. These process perspectives can enable a process modeler to easily manage and navigate around the various perspectives in process design.

The functional perspective 110 can provide a functional breakdown of activities that an enterprise performs. Starting from high-level business functions 112 (e.g., value chain) coarse-grained functions can be broken down into finer-grained functional units by means of functional decomposition. Functional decomposition can be useful for capturing and managing complexity. The functional perspective 110 can also include process activities 114. Process activities are single tasks or steps, which when combined constitute a process.

In this embodiment, the motivational perspective 120 includes key performance indicators (KPI) 124, goals 122, and strategy 126. The notion of motivation is important for business processes because an enterprise needs to consider and track why it executes a particular process. In certain examples, this perspective can be divided in two segments: intentional and directional. The intentional segment captures the enterprise aspirations—the things the enterprise wishes to achieve (e.g., goals 122). Every business process exists for the purpose of achieving some goal, which should be made explicit. When formulating a process goal, it is useful to think about quantifiable results. An example method of formulating quantifiable results is to define appropriate KPIs 124 along dimensions, such as time, cost, or quality, which measure the process and then determine corresponding values.

The directional segment describes what the enterprise may employ to achieve its goals 122, such as strategies 126, business policies, and business rules. The strategy 126 can shape a method for reaching a goal, for example by channeling efforts towards a goal. Business policies and business rules exist to control, guide, and shape strategies. With respect to processes, it is important to know how a particular business process fits into the overall strategy (plan) and what business policies and rules guide (affect) the strategy's execution.

In this embodiment, an organizational perspective 130 can represent which roles and/or organizational units within the organization perform a given process activity. FIG. 1 depicts the Organizational perspective 130, which includes Organizational Units 132, Roles 134, and Process Owners 136. The elements included in the Organizational perspective 130 depicted in FIG. 1 can also be referred to as stakeholders. When modeling business processes, it may be important to stress that processes can run across one or more organizational units within a functional or divisional hierarchy. In an example, a role of the roles 134 is defined as a task and responsibility bundle that can be distinguished from the individuals performing the role 134. The role of the roles 134 can be held by different individuals and one individual can hold several roles of the roles 134. Depicting roles and processes separately enables grouping tasks that belong together and that should be separated from a process perspective before mapping them to the organizational structure. In an example, the process owner 136 is a manager accountable for end-to-end execution of the process; this can be modeled as a special role 134 in the context of the processes.

The resource perspective 140 can describe the various applications and resources that may be used when carrying out certain process activities (e.g., objects, IT systems, or resources needed in order to accomplish the activity). In this embodiment, the resource perspective 140 includes objects 142, technology 144, and media 146. The resource perspective 140 may also include results of certain activities in a process (output). Since the resource perspective 140 can assign input and output parameters to process activities, it can also include data dependencies (e.g., data flow) between process activities. In some examples, processes can be viewed as transformations that manipulate the objects 142 (e.g., create, change, or delete); thus, it may be relevant for the process to capture information about the objects 142 undergoing the transformations and the states the objects 142 take on during the transformations. The technology 144 (e.g., systems, hardware) can be seen as an enabler for certain steps in the process in terms of persistency and efficiency. The media 146 used in a process may have a tight connection to any objects 142 and data involved in the process.

In the present embodiment, the compliance perspective 150 represents compliance requirements within process models. Properly addressing compliance requirements is of high importance to businesses in today's business and regulatory environment. Regulatory requirements can impose specific tasks that must be incorporated into the relevant business processes in order to maintain compliance. Thus, it is important to capture and incorporate tasks dictated by regulations into process models.

The behavioural perspective 160 captures process control flow—it represents a logical ordering of process activities and any causal interrelationships created. The behavioural perspective 160 can be seen as a core of a process representation and provides a connection point for the other perspectives.

In an example embodiment, a process-oriented enterprise ontology framework can capture all of the perspectives illustrated by FIG. 1. Using the specified relationships between the perspectives, the process modeler can easily navigate through different aspects of a process representation and a process space of an enterprise. A process-oriented enterprise ontology framework (referred to previously as a unified meta-model or an enterprise meta-model) in conjunction with a modeling tool that supports process perspectives can easily answer questions such as: "What resources are used by process A?", "What is the goal of process B?", "Which processes does the organizational unit C participate in?", and "What processes are currently performed by business function D?"

Abstraction Levels

Figure 2A:
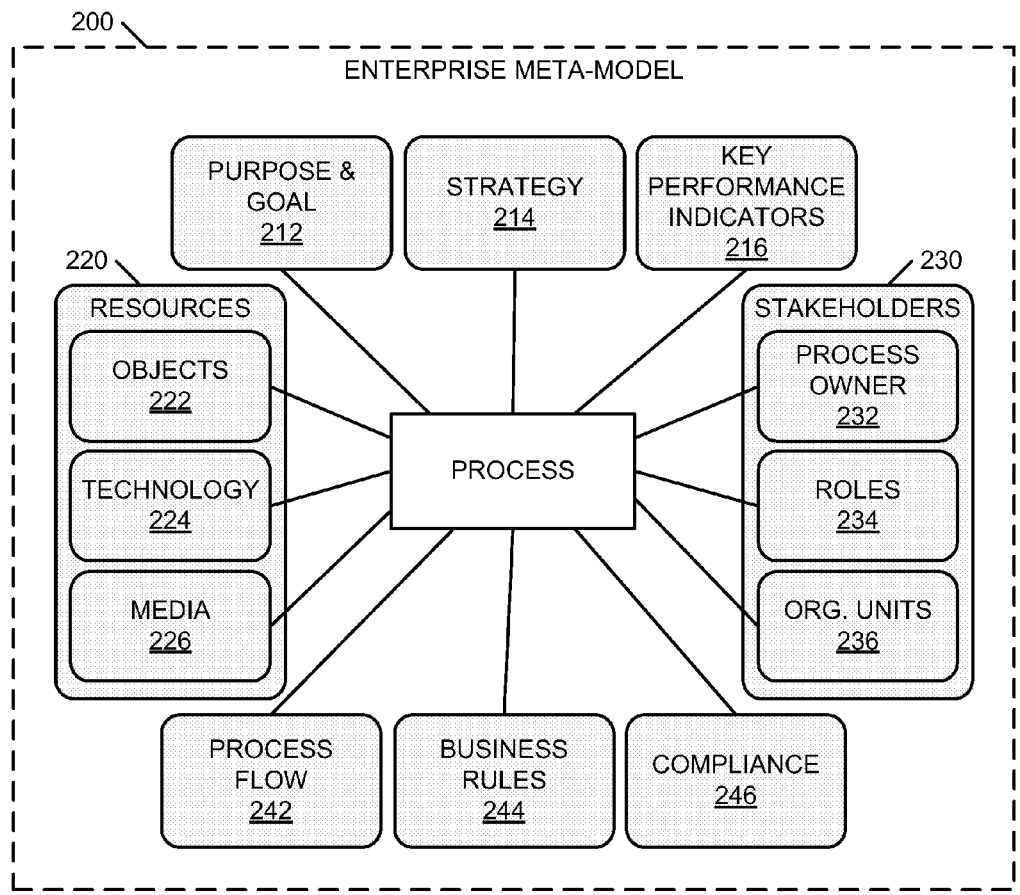
FIG. 2A is a block diagram illustrating an enterprise meta-model without application of any abstraction levels, according to an example embodiment.
Figure 2B:
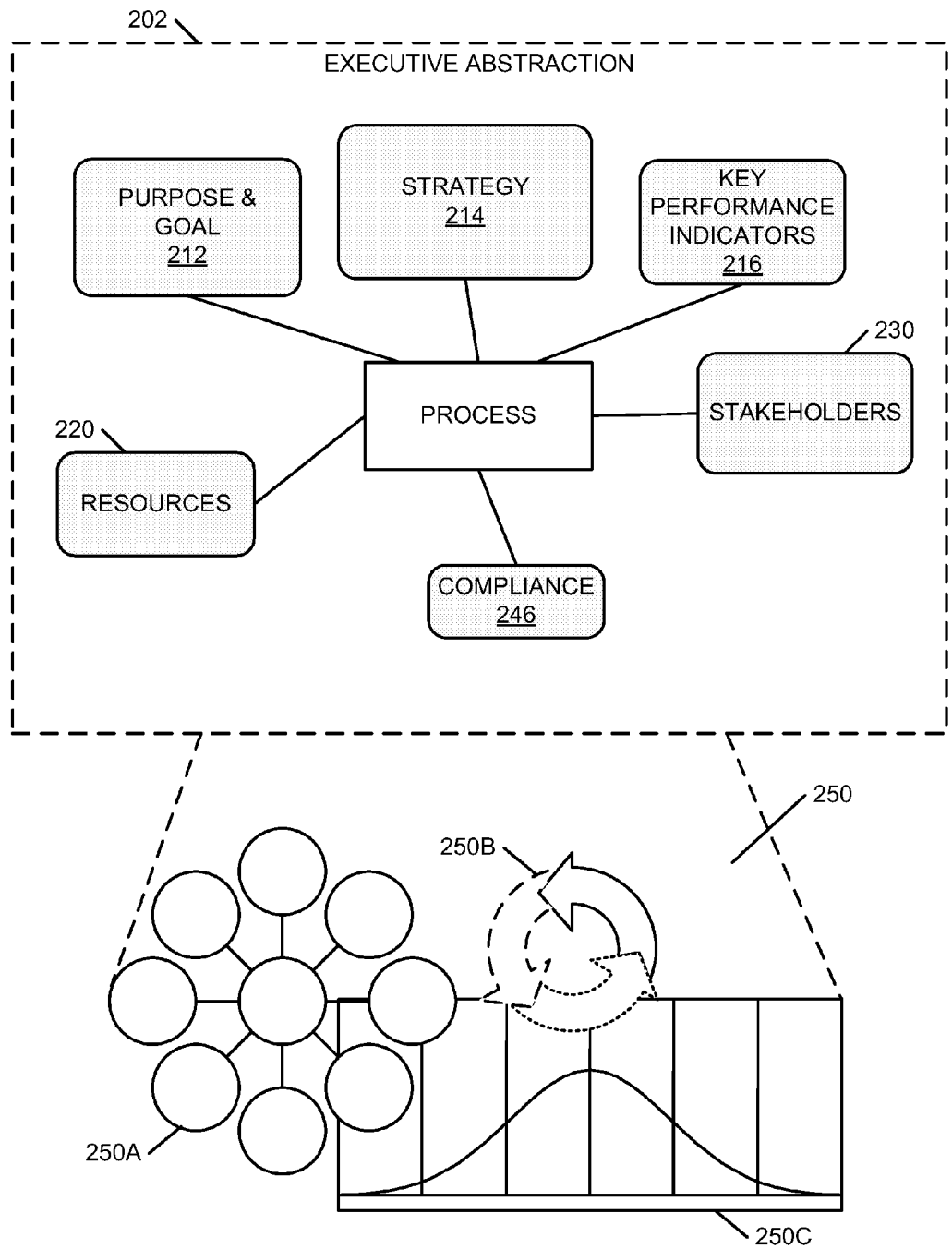
FIG. 2B is a block diagram illustrating an enterprise meta-model with an executive abstraction level applied, according to an example embodiment.
Figure 2C:
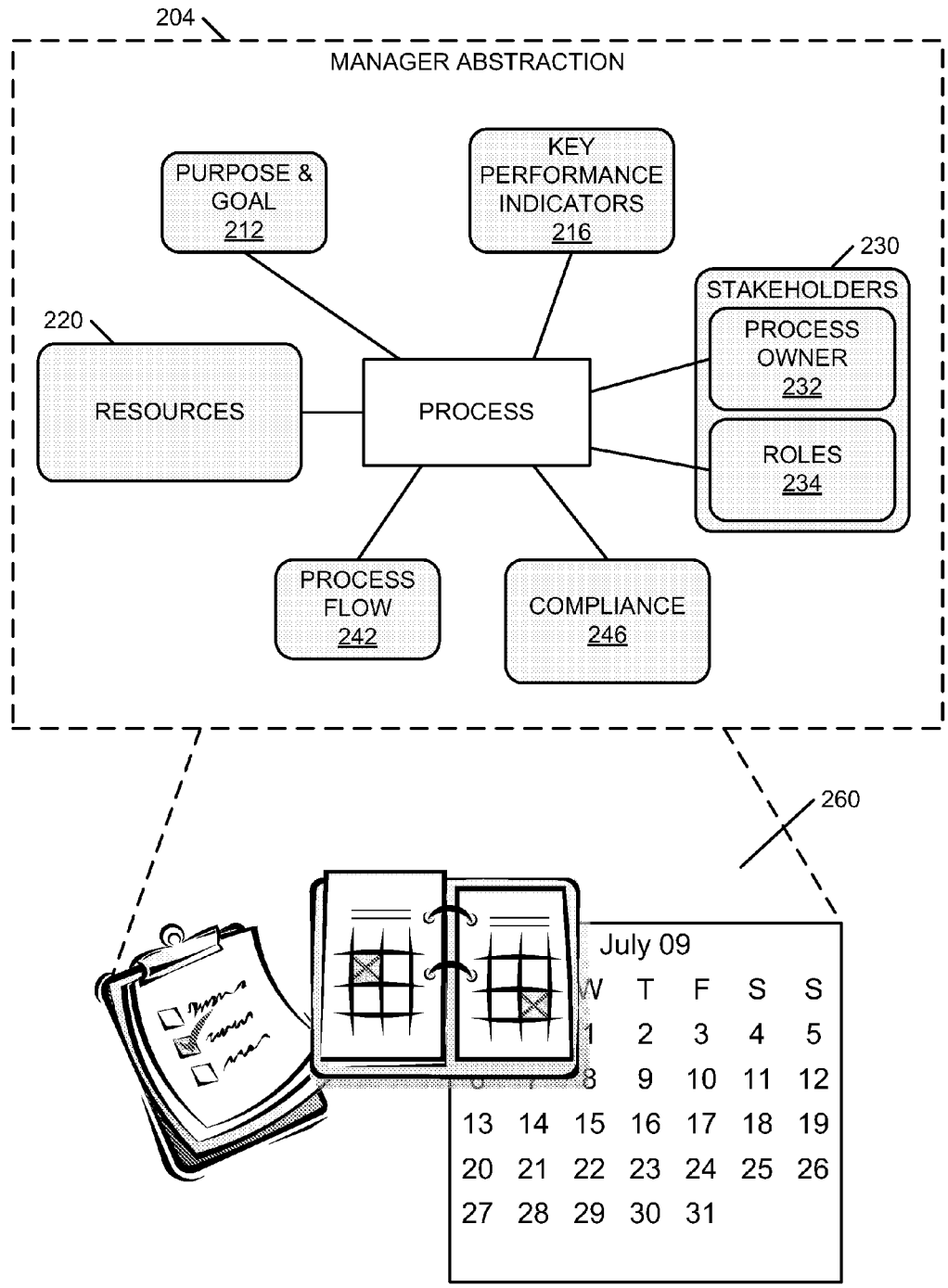
FIG. 2C is a block diagram illustrating an enterprise meta-model with a line of business manager abstraction level applied, according to an example embodiment.
Figure 2D:
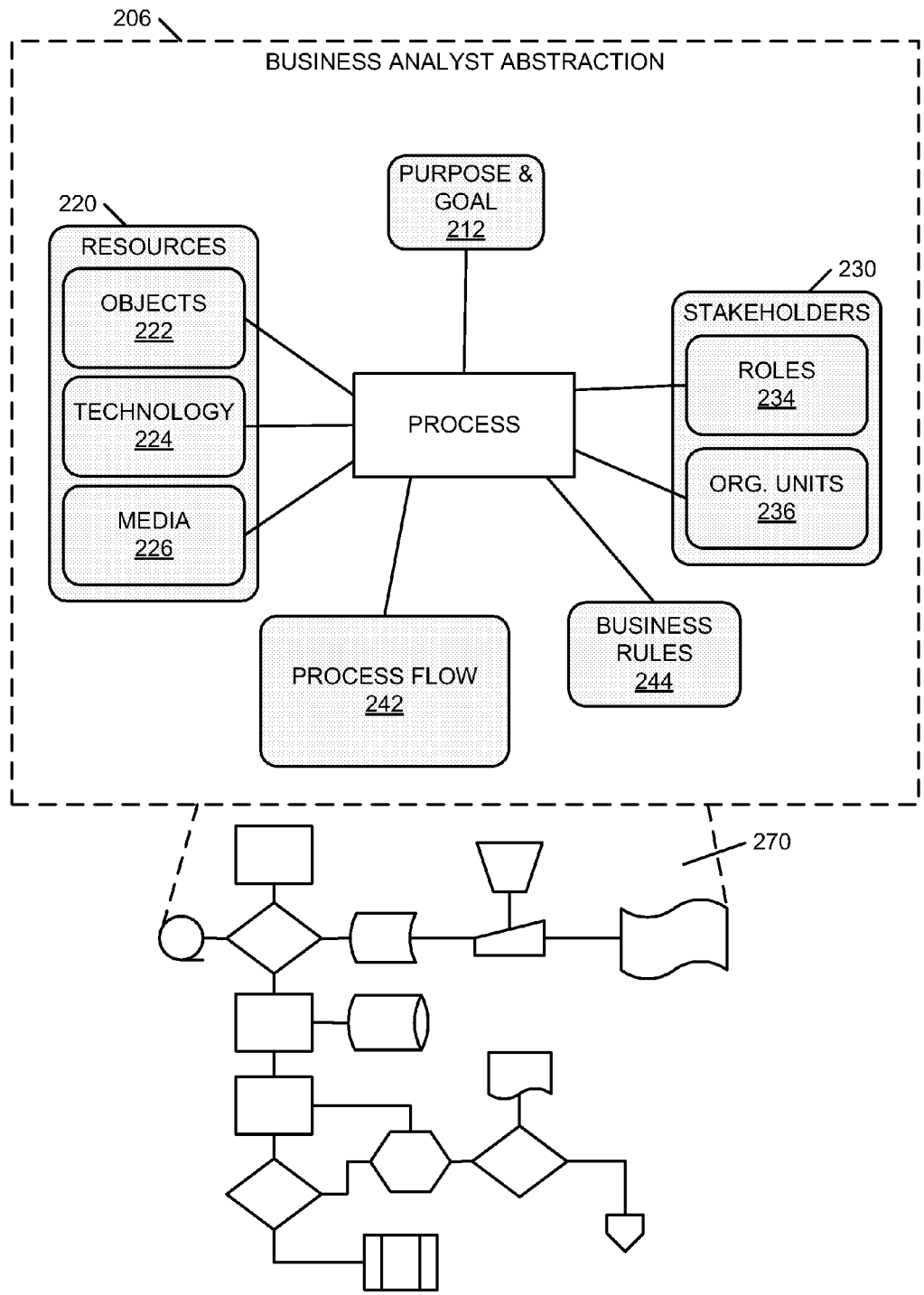
FIG. 2D is a block diagram illustrating an enterprise meta-model with a business analyst abstraction level applied, according to an example embodiment.

FIGS. 2A-2D are block diagrams illustrating three role-based abstraction levels, according to an example embodiment. FIG. 2A depicts an example enterprise meta-model without any abstraction levels applied, while FIGS. 2B-2D depict an application of three different role-based abstraction levels to the enterprise meta-model. The example abstraction levels include an executive level 202, a manager level 204, and a business analyst level 206. Referring to FIG. 2A, the enterprise meta-model 200 includes purpose and goal 212, strategy 214, key performance indicators 216, resources 220, stakeholders 230, process flow 242, business rules 244, and compliance 246. In an example, resources 220 can include objects 222, technology 224, and media 226. In another example, stakeholders 230 can include process owner 232, roles 234, and organizational units 236. The enterprise meta-model 200 can include elements that correspond to the elements depicted in the various process perspectives illustrated in FIG. 1.

FIG. 2B is a block diagram illustrating an enterprise meta-model with a executive abstraction level applied, according to an example embodiment. In this embodiment, the executive (strategic) level 202 of abstraction includes portions of the enterprise meta-model 200 shown in FIG. 2A (e.g., purpose and goals 212, strategy 214, key performance indicators 216, resources 220, stakeholders 230, and compliance 246). In certain examples, a size of the elements illustrated in FIG. 2B indicates the level of complexity or detail included in the abstraction. The executive level 202 allows for setting the enterprise goals and general strategic direction, as is shown in FIG. 2B. Key performance indicators 216 can be determined for measuring the progress in achieving goals. Business policies can be defined in order to govern courses of action for the enterprise. Artifacts 250 created through the executive level 202 may include business goal specifications, strategy documents, and policy guidelines. Individual artifacts 250A, 250B, and 250C represent example artifacts 250 that may be created at the executive level 202. The artifacts 250 on this level of abstraction provide the motivation (e.g., "why") for the processes within the organization, which are defined on further levels. The modeling techniques utilized at the executive level 202 can be rather informal or ad-hoc (e.g., flip chart techniques or mind maps).

FIG. 2C is a block diagram illustrating the manager level 204 abstraction level, according to an example embodiment. In this embodiment, the manager level 204 of abstraction includes purpose and goal 212, key performance indicators 216, resources 220, stakeholders 230, process flow 242, and compliance 246. In certain examples of the manager level 204, the stakeholders can include process owner 232 and roles 234. Based on the artifacts 250 produced at the executive level 202, line of business managers may need to provide quick and intuitive overview of the business processes of an organization. The aim is to depict processes from a high-level perspective with a focus on understanding key points of the process. These high-level processes may be referred to as business scenarios 260, whereby each of the business scenarios 260 represents a set of logically related business processes performed to achieve defined and measurable business goals.

FIG. 2D is a block diagram illustrating the business analyst level 206, according to this example embodiment. The business analyst level 206 includes purpose and goal 212, resources 220, stakeholders 230, process flow 242, and business rules 244. In this example, resources 220 also include objects 222, technology 224, and media 226. Furthermore, stakeholders 230 may include roles 234 and organizational units 236.

Unlike the abstraction levels 202 and 204, depicted in FIG. 2B and FIG. 2C respectively, the business analyst level 206 abstraction faces a variety of purposes in modeling. The purposes can include business process documentation, process improvement, and system requirements specification, among others. Process models or artifacts 270 created at the business analyst level 206 detail each of the business scenarios specified at the other abstraction levels and can serve as a starting point for an underlying information system implementation. There are numerous modeling techniques (e.g., Event-driven Process Chain (EPC), Business Process Modeling Notation (BPMN), Unified Modeling Language (UML) Activity Diagrams) used in the area of business process modeling. However, the Business Process Model Notation (BPMN) has recently emerged as the de-facto standard in the area and is used as a starting point in an example implementation detailed below.

The process modeling visualization technique only provides a starting point. A major problem can occur if the artifacts 250, 260, 270 produced within each of the abstraction levels are not interconnected and integrated. A lack of interconnection or integration can cause problems in communication, inconsistencies, redundancies, and traceability between the abstraction levels and may result in a significant amount of manual work.

The aforementioned process-oriented enterprise ontology framework can serve as a common meta-model for all abstraction levels, as shown in FIG. 2A. Using meta-model projection can derive the abstraction level-specific models depicted in FIGS. 2B-2D. The process-centric knowledge depicted in FIG. 2A can be present on each level of abstraction in smaller or greater detail. Some parts of the enterprise knowledge retained in the enterprise meta-model 200 can grow stronger as we move down the abstraction levels (e.g., process flow).

Of course, high-level knowledge such as strategic goals and core strategy plans do not vanish as the abstraction levels include a level of higher detail, as shown in FIGS. 2C and 2D. The artifacts 250, 260, 270 are refined and are superimposed by a more concrete view. For example, strategic goals become measurable and timed operational goals and strategic directions transform into detailed process plans. In an embodiment, the executive level 202 abstraction encompasses concepts related to the motivational perspective (e.g., goals, strategy, KPIs, etc.), but the executive level 202 is not interested in detailed process flows, information systems supporting the processes, or business objects. In this embodiment, the enterprise meta-model 200 can be reduced (e.g., configured) to the executive level-specific needs and a new model is generated by meta-model projection, as shown in FIG. 2B. As has been described above, this approach can be extended to derive abstraction-level specific models for the line of business manager (FIG. 2C) and business analyst levels (FIG. 2D). By having a unified enterprise meta-model 200, the artifacts (e.g., artifacts 250, 260, 270) created within a particular abstraction level can be integrated with artifacts created at the other abstraction levels, allowing for the artifacts to be more easily traced and navigated across all abstraction levels created for a particular enterprise.

Visual Modeling Implementation Overview

Figure 3:
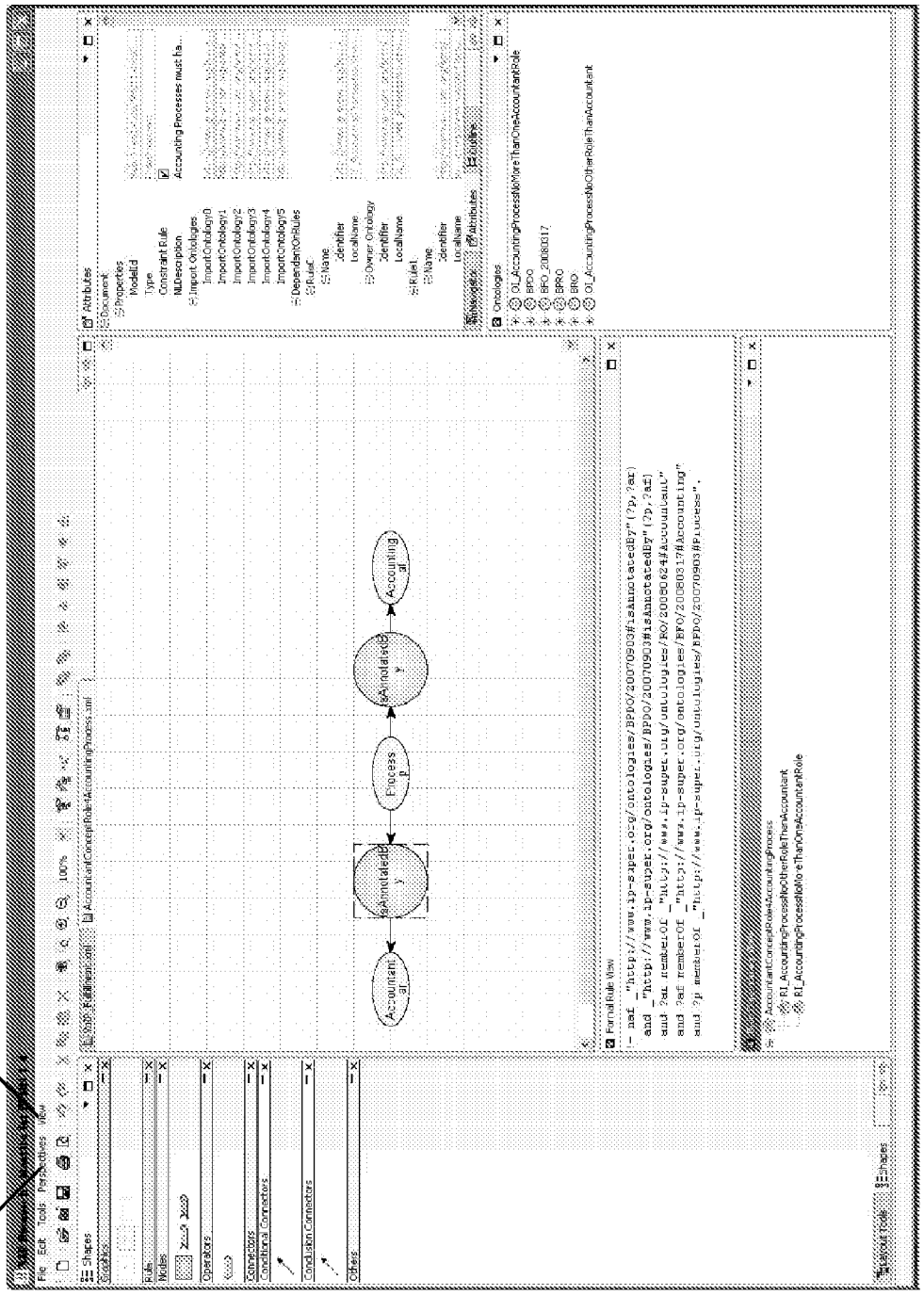
FIG. 3 is an illustration of a user-interface screen depicting a visual rule modeling interface with a compliance perspective applied, according to an example embodiment.

FIG. 3 is an illustration of a user-interface screen depicting a visual rule modeling interface with a compliance perspective applied, according to an example embodiment. FIG. 3 illustrates an implementation extending BPMN by adding new visual elements and auto-layout algorithms, among other things. The extensions to BPMN and the integration of a process-oriented ontology framework (e.g., enterprise meta-model 200) focus on enabling the multiple view modeling paradigm discussed above in reference to FIG. 1-FIG. 2D.

FIG. 3 depicts a rule modeling perspective, which is a result of meta-model projection to the compliance perspective from FIG. 1. Compliance requirements are expressed in terms of business policies and rules which implement the compliance requirement. Hence, the user is provided with a modeling notation for designing business rules which are to be adhered to within process models.

Figure 4:
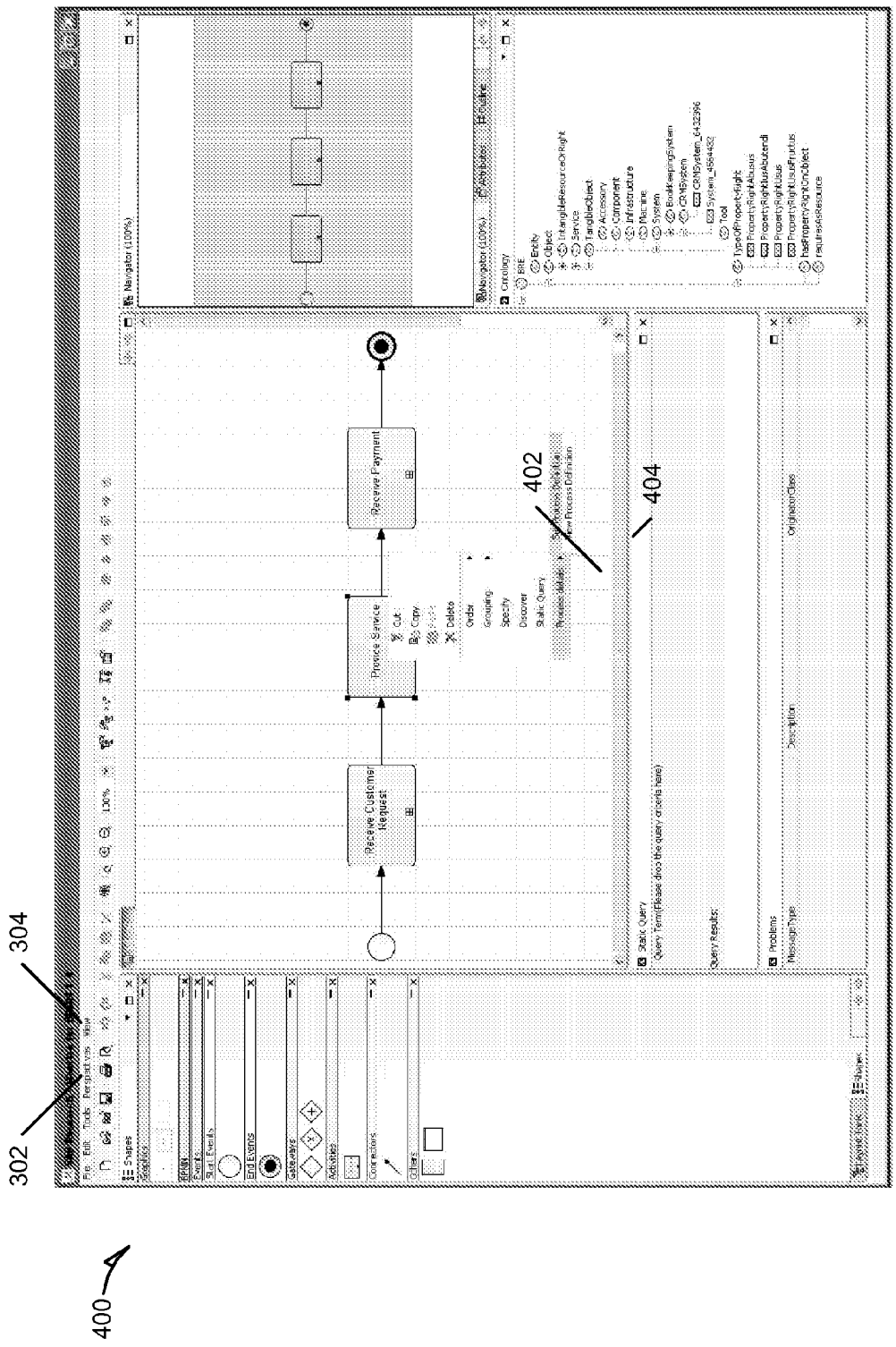
FIG. 4 is an illustration of a user-interface screen depicting a visual modeling interface with a business line manager abstraction level applied, according to an example embodiment.

In order to support various abstraction levels as depicted in FIG. 2A-FIG. 2D, BPMN constructs for depicting business scenarios are used within a manager modeling view 400 depicted in FIG. 4. FIG. 4 is an illustration of a user-interface screen depicting a visual modeling interface with a business line manager abstraction level applied, according to an example embodiment. A particular step in the scenario can be detailed through attaching a process by selecting a set process definition 402 menu item as shown in FIG. 4. At any point in time, the user can choose to see a more detailed view of the selected portion of the business scenario by selecting a view process definition 404 menu option, which is then opened for editing in a business analyst modeling view 500, as depicted in FIG. 5.

Figure 5:
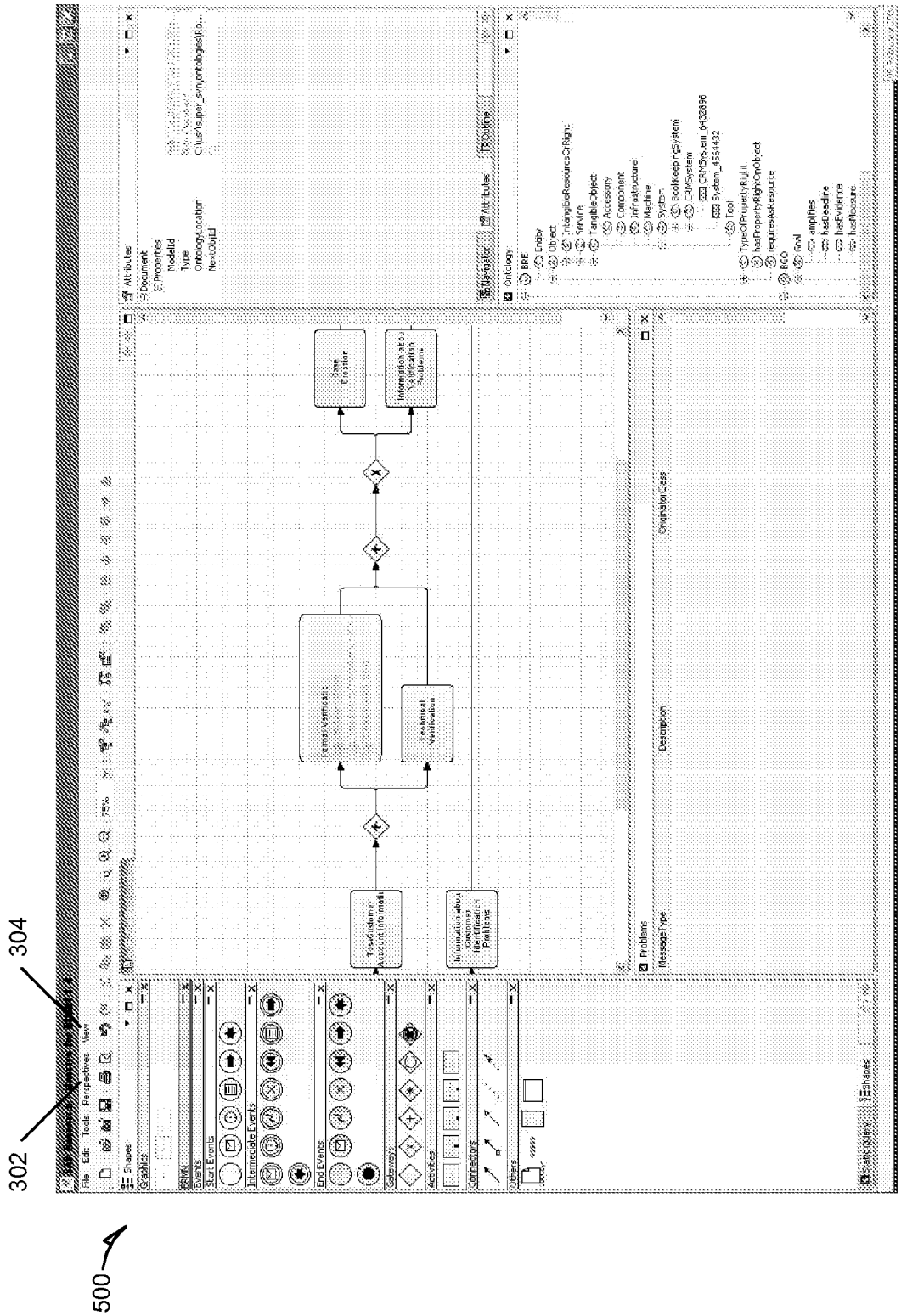
FIG. 5 is an illustration of a user-interface screen depicting a visual modeling interface with a business analyst abstraction level applied, according to an example embodiment.

FIG. 5 depicts the business analyst modeling view 500 for the compliance perspective, according to an example embodiment. The business analyst modeling view 500 supports the full BPMN specification and allows for adding details to process descriptions. The additional details assist in the technical implementation of the process models within target information systems.

A user can easily select the desired modeling perspective or abstraction level through the perspective 302 menu and view 304 menu provided as a menu options within each of FIG. 3-FIG. 5. Providing a unified enterprise meta-model enables integration of the artifacts created in various perspectives/views and thus provides top-down linkage and bottom-up traceability in an organization's process space. Also, separation of concerns in process design through this approach significantly reduces the complexity of process modeling. Furthermore, the formal description of different process aspects enables advanced types of business process analysis.

Compliance Embodiment

Figure 6:
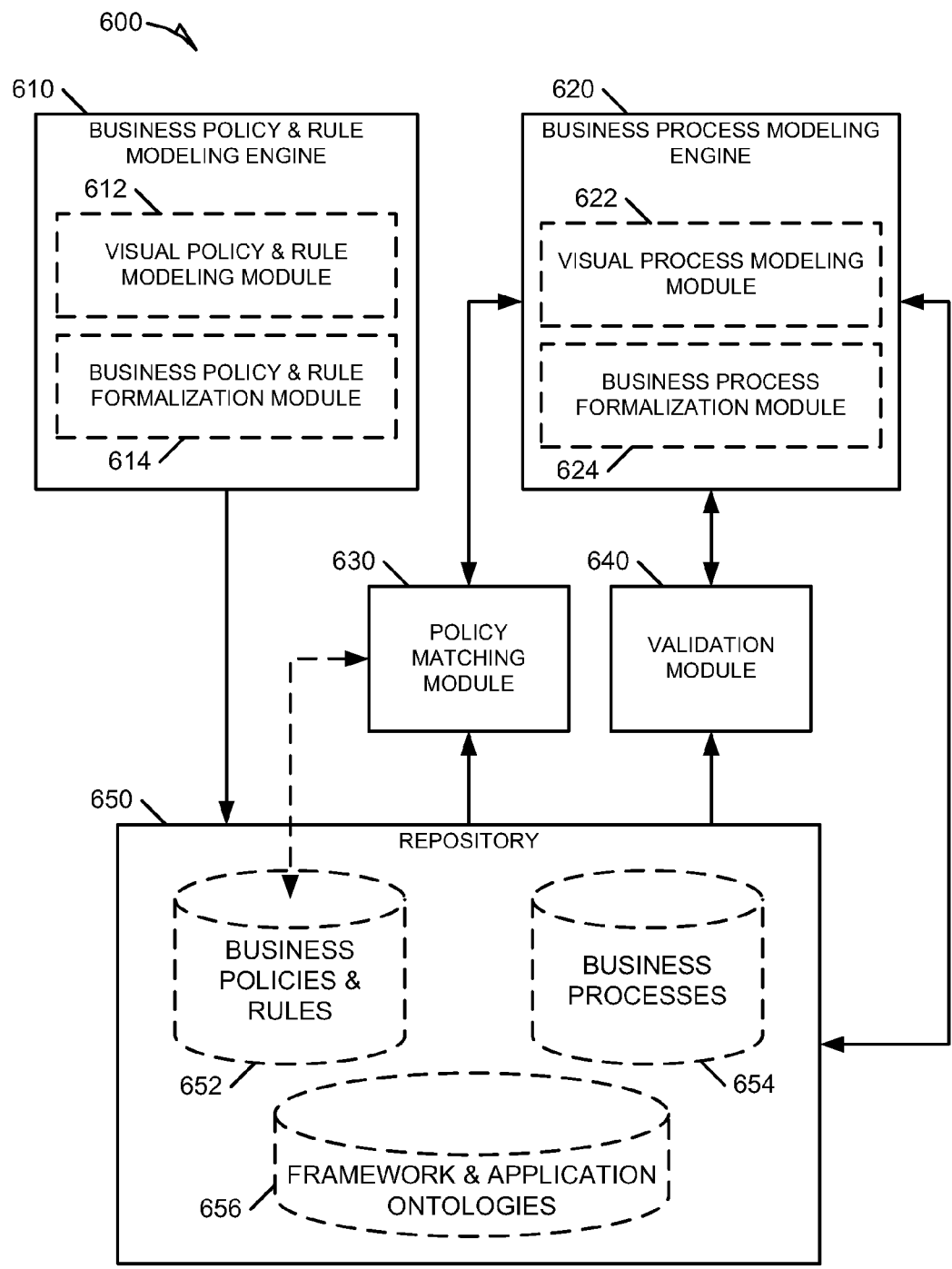
FIG. 6 is a block diagram illustrating a system for integrating process perspectives and abstraction levels into business process modeling, according to an example embodiment.

FIG. 6 is a block diagram illustrating a system for integrating process perspectives and abstraction levels into business process modeling, according to an example embodiment. The system 600 includes a business policy and rule modeling engine 610, a business process modeling engine 620, a policy matching module 630, a validation module 640, and a repository 650. In certain examples, the business policy and rule modeling engine 610 can include a visual policy and rule modeling module 612 and a business policy and rule formalization module 614. The business process modeling engine 620 can also include a visual process modeling module 622 and a business process formalization module 624. In some examples, the repository 650 can include a business policies and rules database 652, a business processes database 654, and a framework and application ontologies database 656. In an example, the enterprise meta-model 200 discussed above is stored within the repository 650.

The business policy and rule modeling (BPRM) engine 610 allows a process modeler to model business policies and business rules using a process-oriented enterprise ontology framework and application ontologies of an enterprise, stored within the repository 650. Besides describing business policies in natural language, the BPRM engine 610 allows users to model the context of a business policy using elements defined in enterprise models formalized as ontologies. In some examples, the BPRM engine 610 includes a visual policy and rule modeling module 612 that provides a visual rule editor that enables visual rule modeling by dragging and dropping elements defined in an ontology. The BPRM engine 610 can also enable a user to define a business policy's implementation using business rules and other business policies stored in the repository 650. Finally, in some examples, the BPRM engine 610 can formalize modeled business policies as instances of the Business Policy and Rule Ontology (BPRO), which can also be stored in the repository 650. Some important concepts, attributes, and relations in BPRO that are utilized are shown in FIG. 7 as a class diagram using the stereotype extensibility mechanism of UML.

Figure 7:
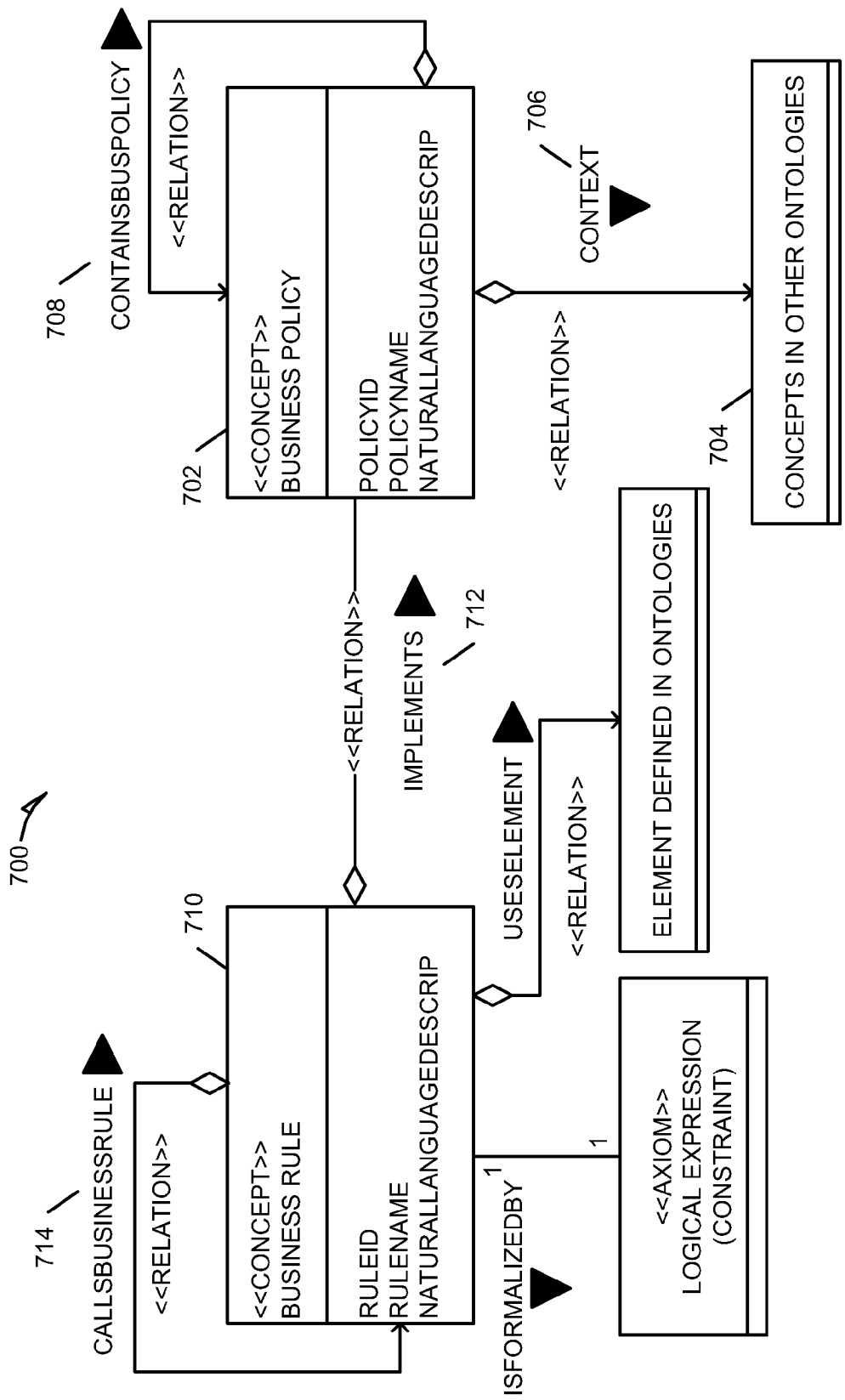
FIG. 7 is a block diagram illustrating business policy and business rule formalization constructs, according to an example embodiment.

Referring to FIG. 7, in addition to standard attributes such as PolicyID, PolicyName, and NaturalLanguageDescription, a business policy 702 can integrate with other enterprise models and concepts in other ontologies 704 using the context relation 706. Using the context relation 706, it is possible to capture rationale for existence of the business policy 702 by connecting to a goal or strategy defined in business motivation model of an enterprise. Similarly, by connecting to other enterprise models 704 it is possible to capture the applicability criteria of the business policy 702. For example, a business policy 702 applicable to all business processes involving a particular organization unit can be achieved by integrating an organizational unit from the organizational structure model to a business policy using the context relation 706. In another example, it is possible to restrict the scope of a business policy 702's applicability by associating the business policy 702 with a particular business function from a functional view of an enterprise. The applicability criteria of the business policy 702 captured by integrating it with other enterprise models 704 defines the context relation 706 of the business policy 702. This can enable integration of a business policy model with other enterprise models. The capture of contextual information of business processes and business policies is addressed partially with respect to business policies. How contextual information, with respect to business processes, is captured is discussed below.

The business policy 702 can be composed of other business policies using a relation contains BusinessPolicy 708 and/or business rules 710 which implement the business policy 702 using a relation implements 712. For example, a high-level business policy 702 can be composed of many low-level operational business policies that are in turn implemented as business rules. The business rules 710 are more formal compared to the business policies 702 and hence it is possible to enforce automatically or semi-automatically business policies 702 in terms of business rules 710 on business process models. Similarly, a business rule 710 can call other business rules 710 using a relation callsBusinessRule 714. These relationships allow for composition and organization of business policies 702 and business rules 710.

In addition, natural language description of business rules 710 can also be specified using an attribute NaturalLanguageDescription of the business rule 710. In an example, there is no restriction in building business rules 710 using elements from any particular ontology. Business rules 710 constraining not only process models but also any other enterprise model can be built using elements defined in any ontology from the repository 650. Hence, specification of business rules 710 for other enterprise models can be accomplished. Therefore, the business rule 710 can be formed involving multiple enterprise models, and similarly, the business policy 702 can include business rules 710 constraining many enterprise and process models. This enables consideration of the complex nature of enterprise models and business process models while modeling business policies 702 and rules 710. A simple example of this concept is discussed below under the heading Policy Modeling Example.

Referring again to FIG. 6, in an example embodiment, the BPRM engine 610 includes a business policy and rule formalization module 614 that transforms a visually modeled rule into a constraint that can be enforced on process models and saved in the repository 650, as an axiom. The business policy and rule formalization module 614 relieves users from needing to know formal logics and provides a transformation from modeling language to underlying formal logics. The business policy and rule formalization module 614 also addresses the issue of modeling tools that lack a means of visualization for complex axioms of an ontology.

The formal language specification for business policies and rules is provided by the underlying formal logics of the ontology language used to model the business policies and rules. In an example embodiment, the ontology language used is the Flight variant of Web Service Modeling Language (WSML) based on Web Service Modeling Framework (WSMF). WSML Flight is based on a datalog subset of F-Logic. WSML Flight allows datalog style rules (e.g., head: -body) for inferring new knowledge (e.g., head) when a set of conditions (e.g., body) are true. It also enables modeling of database style constraints which contain only the body and begin with a symbol (!-). This embodiment allows for modeling of business rules that result in inferring new knowledge as well as modeling constraint style business rules that can be enforced on process models. In this embodiment, WSML Flight provides a formal platform for capturing information related to process and enterprise models in order to perform formal analysis. Other examples of formal languages that can be used include F-Logic or Semantic Web Rule Language (SWRL).

The business process modeling engine 620 enables a process modeler to use Business Process Modeling Notation (BPMN) to model processes. In certain examples, the business process modeling engine 620 includes a business process formalization module 624 that can transform a BPMN process model into an instance of a Business Process Ontology (BPO). In certain examples, the transformation is based on a π-calculus formalization of workflow patterns. In some examples, the Business Process Ontology is stored in the repository 650.

A business process model can be enriched with the process-related information (e.g., a business function it performs, an organizational unit which performs it, a process goal, a metric, etc.) by means of semantic annotation. Process-oriented enterprise ontology framework and ontologized enterprise models provide the process-related information. This enrichment of a business process model with process-related information defines its context as it captures information regarding its design and execution situation. Similarly, business policies can also be attached to a business process model using semantic annotation.

Explicit capture of contextual information of processes and policies can be useful to assist the process modeler in finding relevant policies for a given process. The system 600 includes a policy matching module 630 that can help to overcome the problem of locating relevant business polices and rules by providing a ranked list of business policies with respect to the currently modeled process. The business process modeling engine 620 allows the process modeler to make a final decision on the applicability of results returned by the policy matching module 630. The matchmaking process as engaged by the policy matching module 630 can be defined as a process that returns all advertisements from a repository where those advertisements are published that may potentially satisfy the requirements specified in a given request as input. In this example embodiment, business policies are the advertisements that are published with their context in the repository 650. The context of the currently modeled process acts as a request. The process modeler is interested in finding all potentially relevant business policies for the process being modeled.

In an example embodiment, the matching algorithm defines three different types of matches: exact, relaxed, and no match. Since WSML Flight works with instances of concepts, matching (e.g., exact, relaxed, and no match) is defined with respect to instances in this example. A different formalization language may enable a different matching granularity. An exact match occurs if the same instance used in the process context also appears in the policy context. A relaxed match can occur in one of the following example cases: (1) if an instance in the policy context has the same concept as the instance in process context, (2) if the concept of an instance in the policy context is a super-concept of the concept of an instance in the process context, (3) if the concept of an instance in the policy context is sub-concept of the concept of an instance in the process context. No match occurs when an instance in the process context has no instance in the policy context for the whole concept hierarchy in the corresponding ontology. In this example, exact matches are preferred over relaxed matches.

Figure 8:
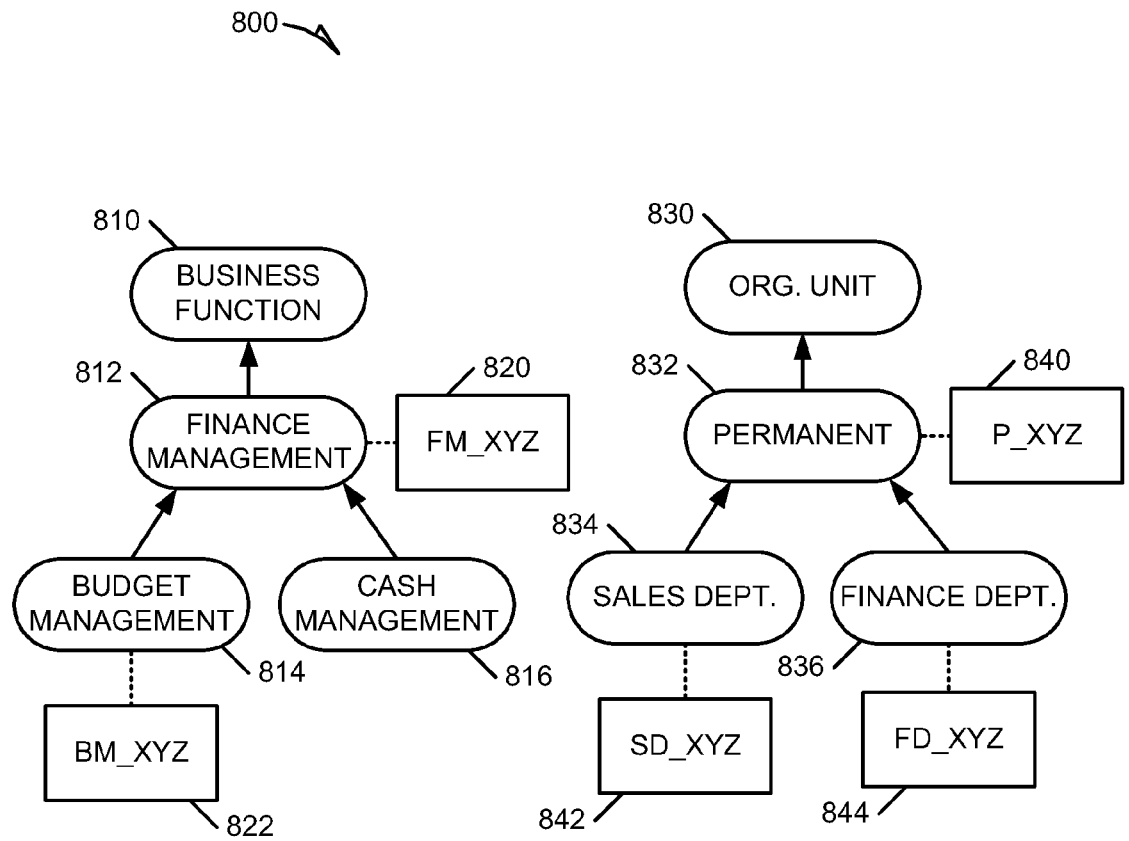
FIG. 8 is a block diagram illustrating a set of business function concepts and a set of organizational unit concepts, as well as various instances of these concepts, according to an example embodiment.
Figure 8:
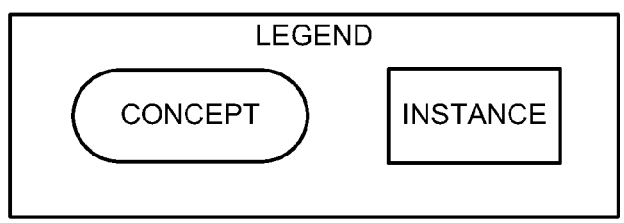

The policy matching module 630 may need to take into account that a process context can be formed by instances of concepts in different ontologies. Hence each addition of an instance to the process context increases the scope of the search. For example, consider application ontologies of XYZ enterprise as shown in FIG. 8. FIG. 8 illustrates an example ontology 800 that includes set of business function 810 concepts and a set of organizational unit 830 concepts, as well as various instances 820, 822, 840, 842, and 844. The business function 810 includes child concepts finance management 812, budget management 814, and cash management 816. The organizational unit 830 concept includes child concepts permanent 832, sales department 834, and finance department 836. A financial process of XYZ enterprise may have a context containing an instance corresponding to the finance management 812 business function, namely FM_XYZ 820, and an instance corresponding to the finance department 836, namely FD_XYZ 844. In this example, the process modeler might be interested in business policies not only containing both FM_XYZ 820 and FD_XYZ 844 instances in context, but also those business policies that contain either one of them. Therefore, each instance in the process context needs to be checked separately; hence the scope increases. In certain examples, it may be necessary (or desirable) to find business policies for the whole concept hierarchy (e.g., a business process with a context BM_XYZ 822 may still need to satisfy business policies with FM_XYZ 820 as a context), as budget management 814 is a specialization of finance management 812. This example corresponds to the second category of relaxed matches. The scope of search also increases on traversing up the concept hierarchy and business policies containing BM_XYZ 822 as context information will also appear in search results, since budget management 814 is one of the finance management 812 activities. However, this type of relaxed match will be ranked lower when compared to exact matches.

The policy matching module 630 may also check process context against the context of all business policies in the business policy and rules database 652. An example algorithm begins by looking for an exact match for each instance in the process context against a business policy context. If an exact match is not found, then relaxed match checks are performed for the whole concept hierarchy and a list of matched instances for the business policy context is recorded. Finally, the number of instances that have exact matches and the number of instances that have relaxed matches are recorded. In this example, a business policy is selected if at least one instance of its context matches with any instances in the process context either through exact or relaxed match. Subsequently, ranking occurs based on the number of exact matches and the number of relaxed matches. A business policy is ranked higher if it has a higher number of exact matches compared to others. If the number of exact matches is the same, then the number of relaxed matches is considered in the ranking process.

The policy matching module 630 provides support in finding relevant business policies for a process model. A ranked list of relevant business policies is provided to assist the process modeler in making final decisions regarding the relevance of each returned policy to the currently modeled business process.

Figure 9:
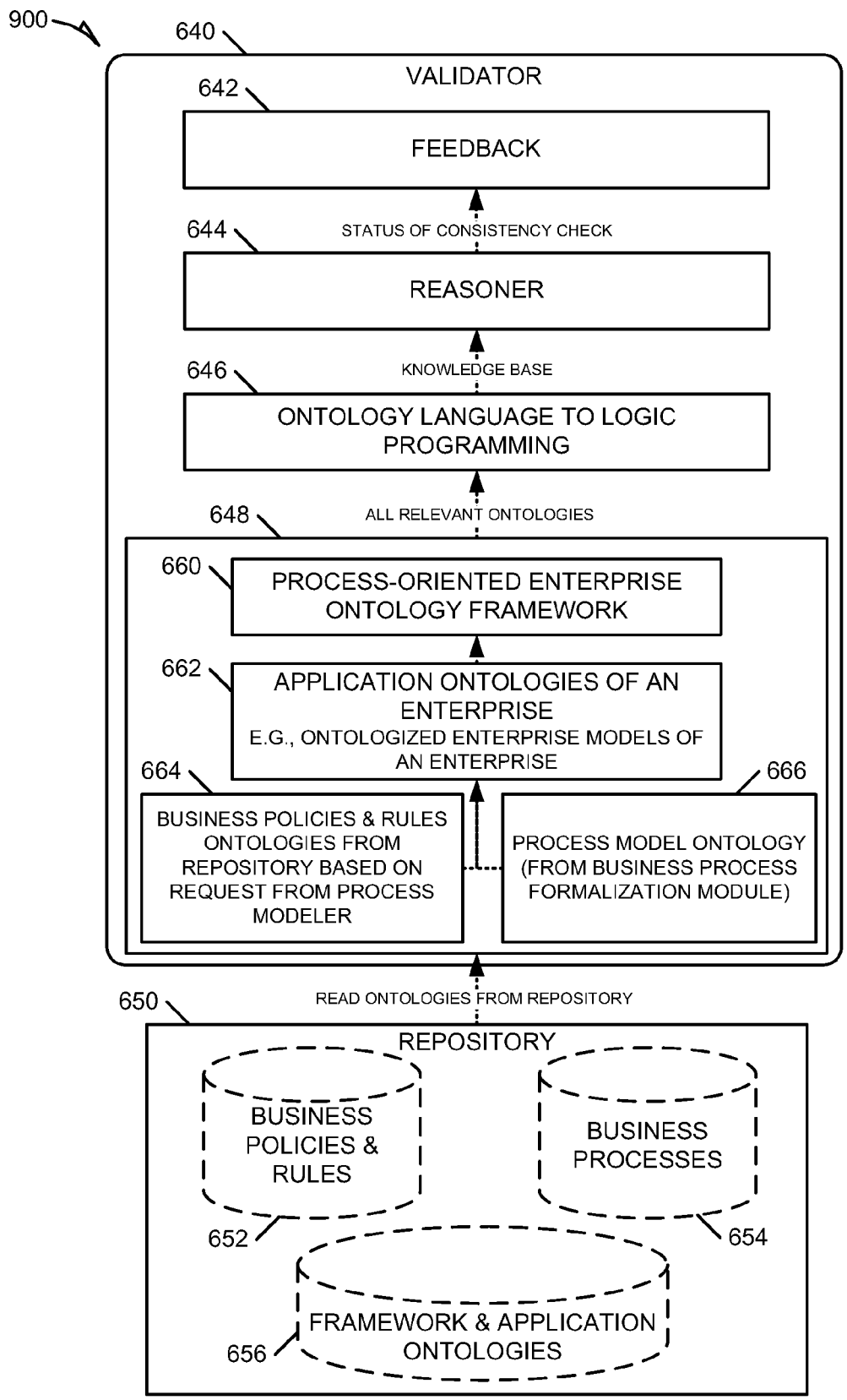
FIG. 9 is a block diagram illustrating a system for validating business processes, according to an example embodiment.

Referring now to FIG. 9, in this embodiment, the process modeler can select business policies from the ranked list for validation against a process model. The validation is performed by the validation module 640. Violation of any business rules that are specified as constraint axioms inside selected business policies is automatically detected through logical reasoning by the validation module 640. The validation module 640 can perform a consistency check on the knowledge base formed of all relevant ontologies via a WSML Flight reasoner 644. In this example, knowledge base 648 is formed of the following ontologies: process-oriented enterprise ontology framework 660, application ontologies of an enterprise 662, process model ontology 666, and business policies and rules ontologies from repository based on request from process modeler 664. Additionally, other ontologies not specifically depicted in FIG. 9 can also be included, such as ontologies corresponding to additional business policies which the process modeler has selected from a ranked list of business policies provided by the policy matching module 630, ontologies of business rules, and enterprise models that are used either in a business process model, business policies, or business rules. Finally, a feedback component 642 of the validation module 640 provides the feedback to the process modeler depending on the status of the consistency check. If the consistency check fails, then the feedback component 642 provides the natural language description of the violated business rule(s) instead of the associated business policy, since the business policy may be implemented by several business rules. The natural language description of the business rule provides the process modeler enough information regarding what led to the detected failure and how to overcome it. Thus, the validation module 640 is capable of providing intelligent feedback on failures.

In certain examples, logical reasoning is used to answer queries to the knowledge base 648 regarding traceability and change impact analysis. Examples of the types of queries that can be useful for change impact and traceability analysis include, but are not limited to: which business rules are part of a business policy implementation; in which business policies do a business rule participates; which processes need to be validated again after change in a given business rule; which business rules need to be checked again on change of a process; which business rules make use of a particular concept or instance of a concept from an ontology. The example system described herein is capable of providing responses to all such queries through the use of logical reasoning.

Technical Implementation Example

Figure 10:
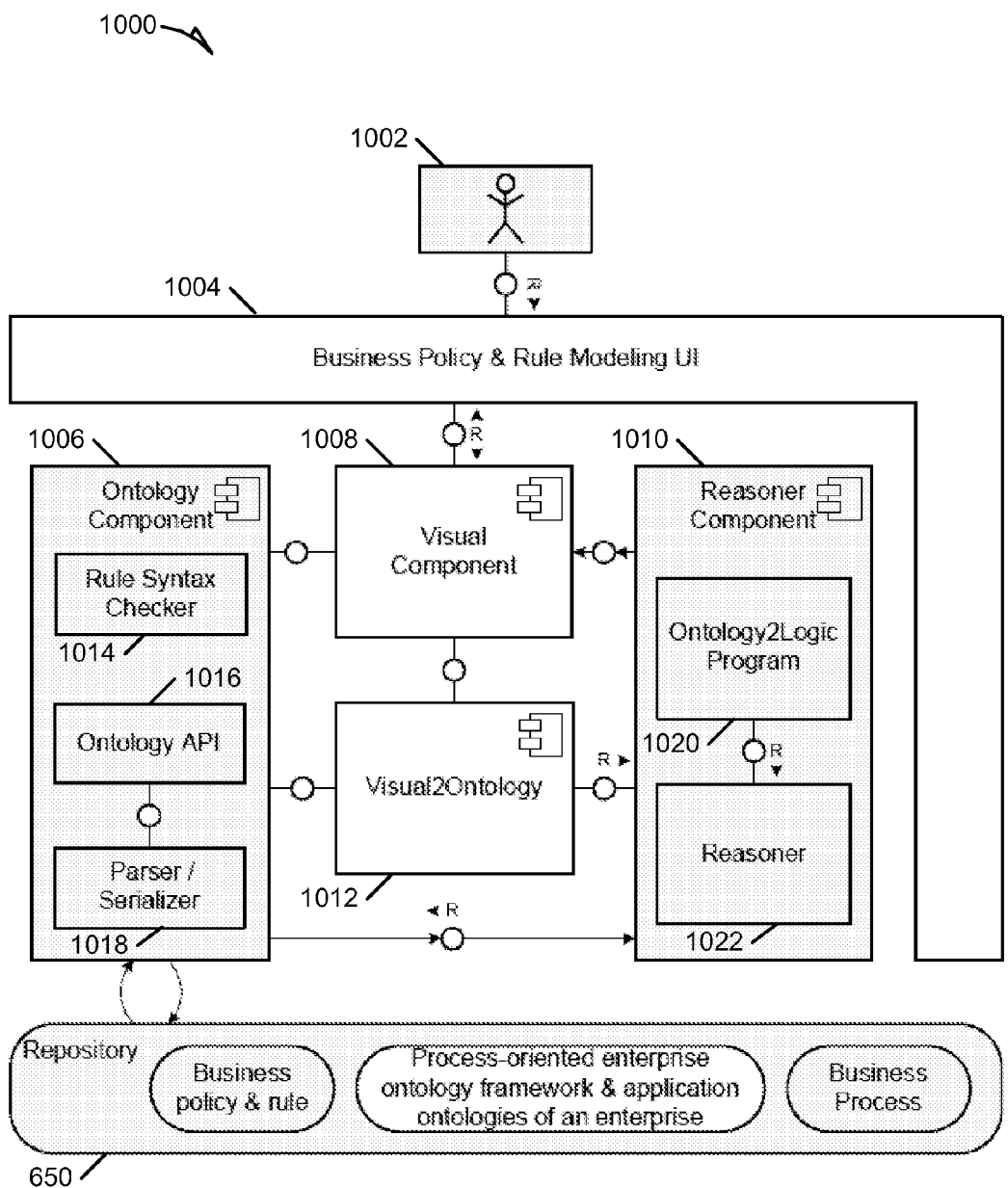
FIG. 10 is a block diagram illustrating a technical implementation of the business policy and rule modeling module, according to an example embodiment.

FIG. 10 is a block diagram illustrating a technical implementation of the business policy and rule modeling engine 610, according to an example embodiment. The various components used within the implementation of a system 1000 are shown in an architecture diagram using fundamental modeling concepts (FMC) notation. The system 1000 includes a business policy and rule modeling user interface 1004, an ontology component 1006, a visual component 1008, a reasoner component 1010, a visual ontology 1012, and the repository 650. In an example, the ontology component 1006 includes a rule syntax checker 1014, an ontology API 1016, and a parser/serializer 1018. Additionally, the reasoner component 1010 can include an ontology2logic program 1020 and a reasoner 1022.

In this example embodiment, a policy modeler 1002 interacts with the business policy and rule modeling user interface 1004, which provides visual modeling elements depending upon whether a business policy or a business rule is being modeled. The business policy and rule modeling user interface 1004 also supports the policy modeler 1002 by loading different ontologies for modeling policies or rules. The visual component 1008 supports the grammar of the visual modeling elements that are based on the ontology elements presented by the business policy and rule modeling user interface 1004. The policy modeler 1002 can model business policies and business rules by dragging and dropping different elements of an ontology, such as concepts or instances. The visual component 1008 interacts with the business policy and rule modeling user interface 1004 and also handles various events arising due to user interaction, thereby separating the presentation layer from the underlying application logic. The visual component 1008 interacts with the ontology component 1006 that provides ontology-related functions such as parsing and serializing an ontology using the parser/serializer 1018. The visual component 1008 also interacts with the visual ontology 1012 component which transforms a visually modeled business policy or rule into an instance of BPRO.

In an example of modeling a business rule, the visual ontology 1012 component is also responsible for transforming the visually modeled business rule into an axiom in the underlying ontology language. In an example, the underlying ontology language is WSML Flight. The axiom is then checked for its syntactic grammar based on the underlying ontology language by the rule syntax checker 1014 in the ontology component 1006. Once the modeled business rule has been checked to ensure its syntactical correctness, according to the visual and underlying ontology language grammars, then an instance of BPRO is created. Finally, the modeled business policy or rule is saved into the repository 650 using the parser/serializer 1018 portion of the ontology component 1006. In certain examples, the modeled business policy or rule will be stored in the business policy and rule database 652. In this example, the reasoner component 1010 is used to ensure that different ontologies used to build the business policy or rule are consistent. The reasoner component 1010 is also used in the validation module 640 as depicted in FIG. 6 and FIG. 9. The ontology2logic program 1020 within the reasoner component 1010 is used to convert an ontology into an underlying reasoner language, such as datalog. In an example, the ontology2logic program 1020 translates the ontology representation from an XML-like format, such as WSML, to a logic program that can be understood and operated on by the reasoner 1022.

In this example, the business policy and rule modeling user interface 1004, the visual component 1008, and the ontology component 1006 provide the functionality of the visual policy and rule modeling module 612 of FIG. 6. While the ontology component 1006, visual ontology 1012 and reasoner components 1010 provide the functionality of the business policy and rule formalization module 614, the ontology component 1006 is used in both the cases as it provides basic functionality, such as the ontology API 1016 that is used by both modules.

Policy Modeling Example

In this example, the system 1000 is used to model a sample business policy and enforce it on a process model in an example scenario. A Separation of Duty (SoD) policy that has wide application as a security mechanism is the focus of this example. In one embodiment, SoD policy states that more than one user (or role) is required to complete a sensitive task. For example, a single user (or role) cannot concurrently perform a certain set of activities within an enterprise. An enterprise may build an SoD matrix that explicitly captures violation scenarios (e.g., both roles are not assigned to the same user) corresponding to a cell where two roles cross in the matrix. A common application of an SoD policy is in financial management activities where an accountant typically performs accounting functions, such as recording financial data activity, and an auditor is responsible for financial functions, such as preparing financial statements.

In order to enrich semantic business process models using semantic annotations, the process-oriented enterprise ontology framework is extended and an application ontology with concrete instances of the concepts is created. However, modeling business rules does not require extending an ontology to define concrete instances as business rules usually apply to all process models unless a business rule is built for one particular process model. Moreover, a business rule created for a particular process model may be prone to frequent changes whenever the process model changes. Hence, business rules are typically created using concepts declared in various ontologies as concepts are less prone to changes.

In the SoD policy example, the business role ontology of the process-oriented enterprise ontology framework is extended to create the application business role ontology. In this example, the application business role ontology contains concrete instances of concepts, including an accountant role and an auditor role. Similarly, the business function ontology is extended to create concrete instances of concepts, including finance-management, accounting, and financial statements. The respective instances can be named FinanceManagementInstance, AccountingInstance, and FinancialStatementsInstance.

Enforcement of the SoD policy may include modeling three independent business rules, which together implement this policy. First, a business rule requiring the accountant role to perform a recording financial data process is created. Second, a business rule requiring that the auditor role perform a preparing financial statement process is created. Finally, a business rule ensuring that no user has both the accountant and auditor role is created. The last (third) business rule constrains the organizational structure model of an enterprise by placing a limitation on which personnel can hold certain roles. This demonstrates how business rules are formulated not only for process models but also for other enterprise models. A single business policy can affect more than one model and not only more than one process model, but any combination of different enterprise models.

Figure 11:
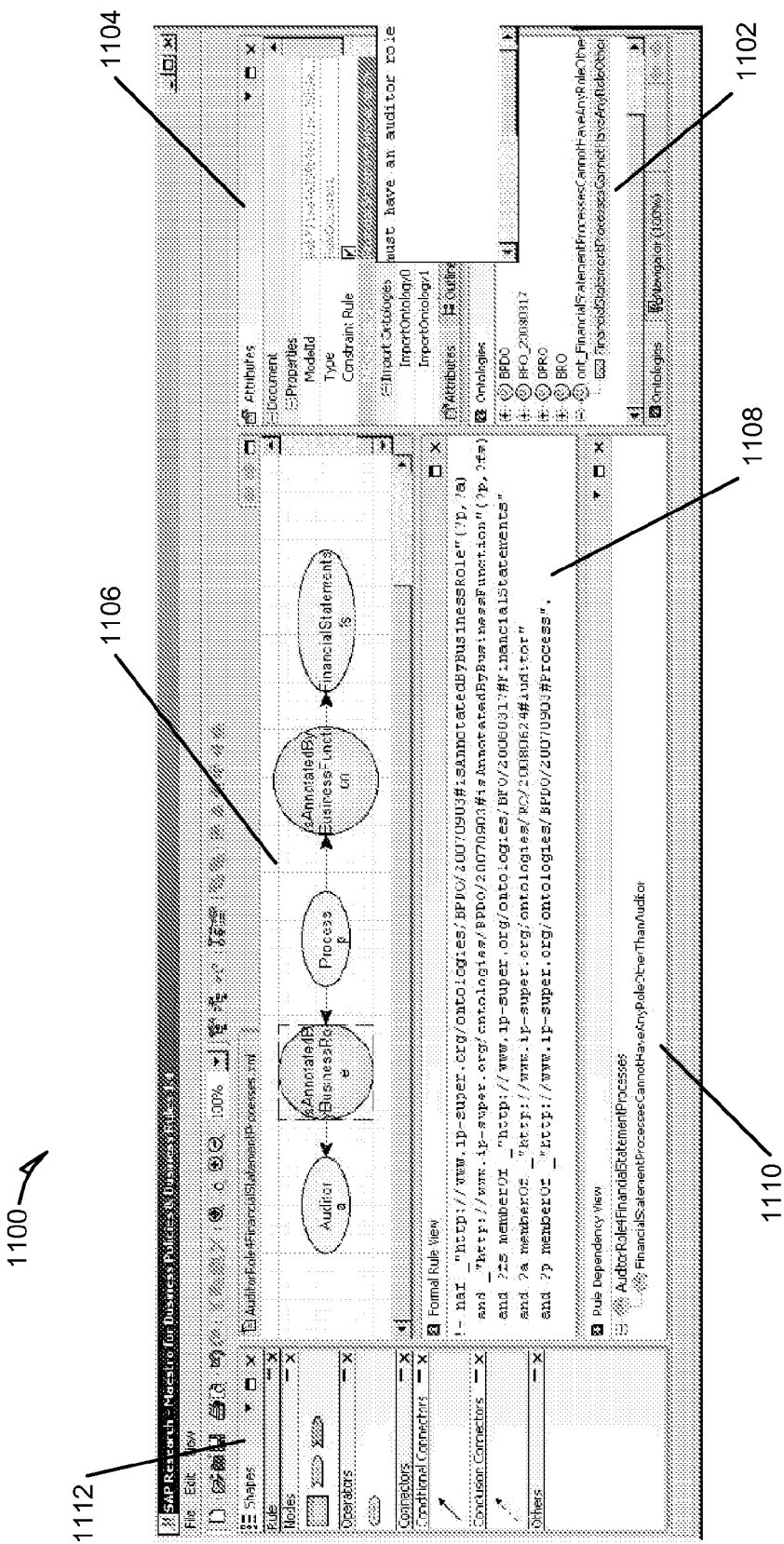
FIG. 11 is a user-interface illustration depicting a visual modeling tool, according to an example embodiment.

FIG. 11 is a user-interface illustration depicting a visual modeling tool, according to an example embodiment. Visual modeling of the second business rule regarding financial statements, discussed above, is shown in FIG. 11. This example user interface 1100 includes six main views, including an ontologies view 1102, an attribute view 1104, a modeling view 1106, a formal rule view 1108, a rule dependency view 1110, and a palette view 1112. The ontologies view 1102 is used to load a desired ontology that is going to be used to model a business rule. Once an ontology is loaded, all its concepts, instances, attributes, and relations can be dragged and dropped into the modeling view 1106 to model a business rule. The palette view 1112 provides additional visual elements for modeling a business rule. The modeling view 1106 is used to visually model business rules by dragging and dropping visual elements and ontology elements from the palette view 1112 and ontologies view 1102, respectively. The attribute view 1104 displays the attributes of a visual element selected in the modeling area. If no visual element is selected, then the attribute view 1104 displays general attributes of the rule being modeled. The attribute view 1104 can also be used to specify what type of rule is being modeled, such as an inference rule or a constraint. The formal rule view 1108 provides a formal representation of the modeled rule in a formal language, such as WSML Flight language in this example. The rule dependency view 1110 shows a list of business rules called in reference to the currently modeled rule (e.g., see the relationships discussed above in reference to FIG. 7).

This example visually models business rules in WSML Flight and does not aim to develop a generic visual rule modeling language. The oval shape in the modeling view 1106 represents a concept defined in an ontology. The circle represents a relation between two or more concepts. The dotted arrow around the circle indicates the negation as failure (naf). WSML Flight is based on a Logic Programming paradigm, which operates with a closed world assumption.

This example implementation is based on the notion of anti-patterns, the explicit capture of violation scenarios, and their detection in models. Hence, the visual modeling of a violation scenario for the second business rule is shown in FIG. 11. In the present embodiment, the visual model states that a violation occurs when any process 'p' is annotated with any instance of the Financial Statements business function 'fs' and is not annotated with any instance of the auditor role 'a'. The business rule is modeled using concepts compared to concrete instances because of the benefits mentioned earlier. Hence, variables are used to represent instances in the business rule that can be evaluated against all concrete instances by the reasoner upon validation by the validation module 640, for example. The formal rule view 1108 displays the equivalent WSML Flight logical expression, and the natural language description of this business rule is also provided in the attribute view 1104.

The example rule discussed above ensures that an auditor role is annotated to the process involving financial statements. However, the rule requiring an auditor does not prevent additional roles from being added in addition to the auditor. Thus, another rule called from this rule may be shown in the rule dependency view 1110. Note that since the business rule to avoid additional role attachment is more closely related to the second business rule, it is called from the second business rule instead of being attached to the business policy directly. The first business rule regarding the accountant role requirement for any process involving the recording of financial data and the third business rule stating that no user can have both roles may be modeled in similar manners.

In addition to attaching the three business rules to the SoD policy, contextual information to be used by the policy matching module 630 to find relevant business policies, while modeling a business process can also be attached to the policy. In this example scenario, the FinanceManagementInstance can be attached as contextual information to indicate that this policy applies to finance management processes.

Figure 12:
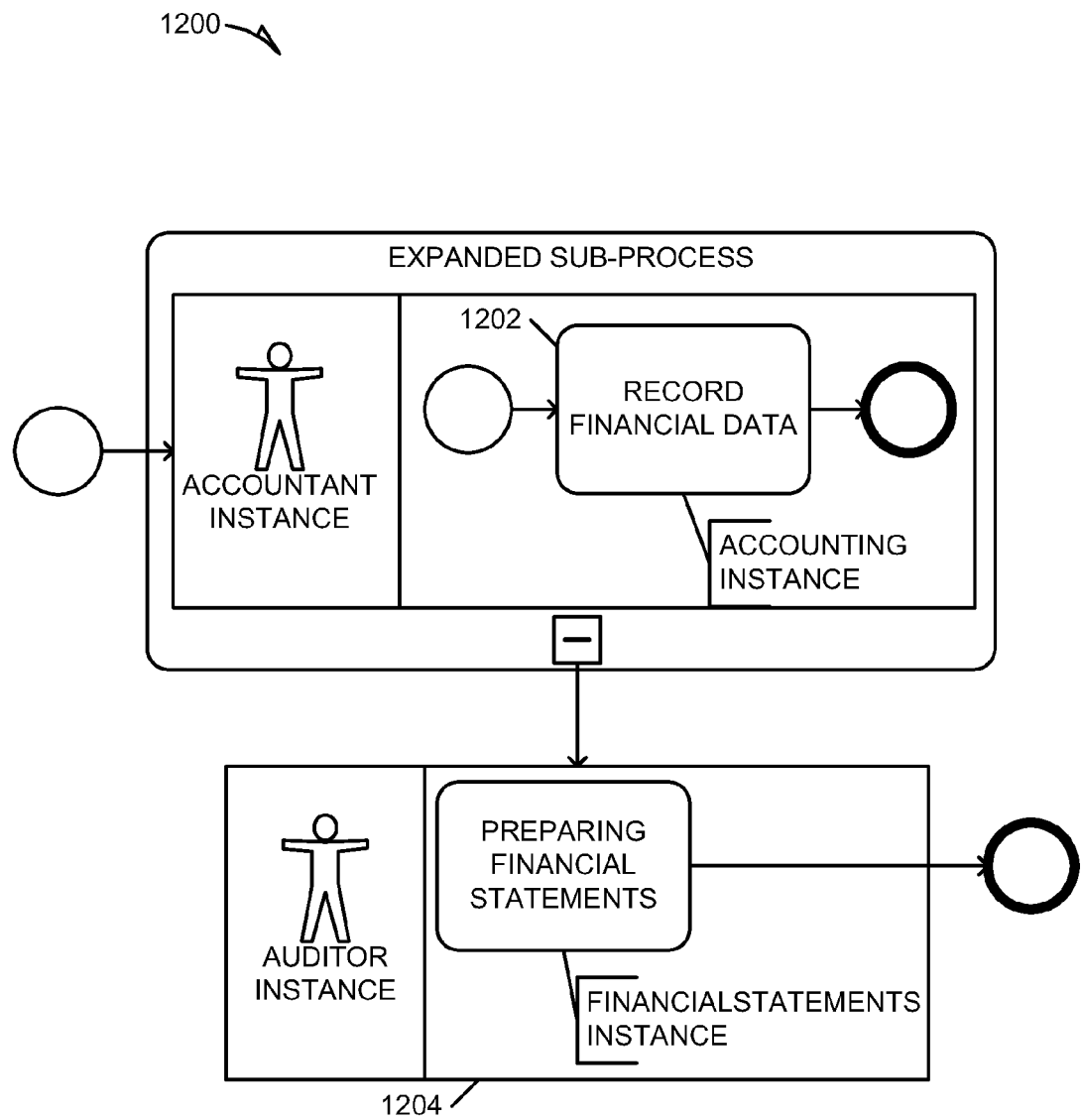
FIG. 12 is a block diagram illustrating an example separation of duty policy in Business Process Model Notation (BPMN), according to an example embodiment.

To demonstrate enforcement of the above modeled SoD policy, a simple financial business process model using BPMN notation is considered in FIG. 12. The process model 1200 includes a record financial data 1202 process and a preparing financial statements sub-process 1204. The process model 1200 contains an expanded sub-process, the preparing financial statements sub-process 1204, that in turn consists of a single task embedded sub-process, included to demonstrate that abstraction levels of processes can be handled. The process record financial data 1202 can be part of other complex processes, such as a purchase or sales process where financial data is recorded when payment is either made or received.

The example business process model 1200 depicted in FIG. 12 is annotated with the instances from the application business role and business function ontology as described earlier, in reference to FIG. 11. The record financial data 1202 process performs an accounting task, as demonstrated by the annotation AccountingInstance. The record financial data task 1202 also requires an accountant role, demonstrated by the annotation of AccountantInstance. Similarly, preparing financial statements sub-process 1204 is annotated with instances including FinancialStatementsInstance and AuditorInstance instance from application ontologies of an example enterprise. Finally, the business process model 1200 can be annotated with FinanceManagementInstance as contextual information to find relevant business policies for validation.

The business process model 1200 shown in FIG. 12 is consistent with the first two business rules. If the organizational structure model is also consistent, there will not be any violation of the example SoD policy. However, consider an example in which the AuditorInstance role is either not attached or some other instance of a role is attached to the preparing financial statement task 1204. In this alternative example, the business rule requiring an auditor instance and no other role instance is violated and an error message with natural language description of the violated business rule is displayed by the system.

Policy Matching

Figure 13:
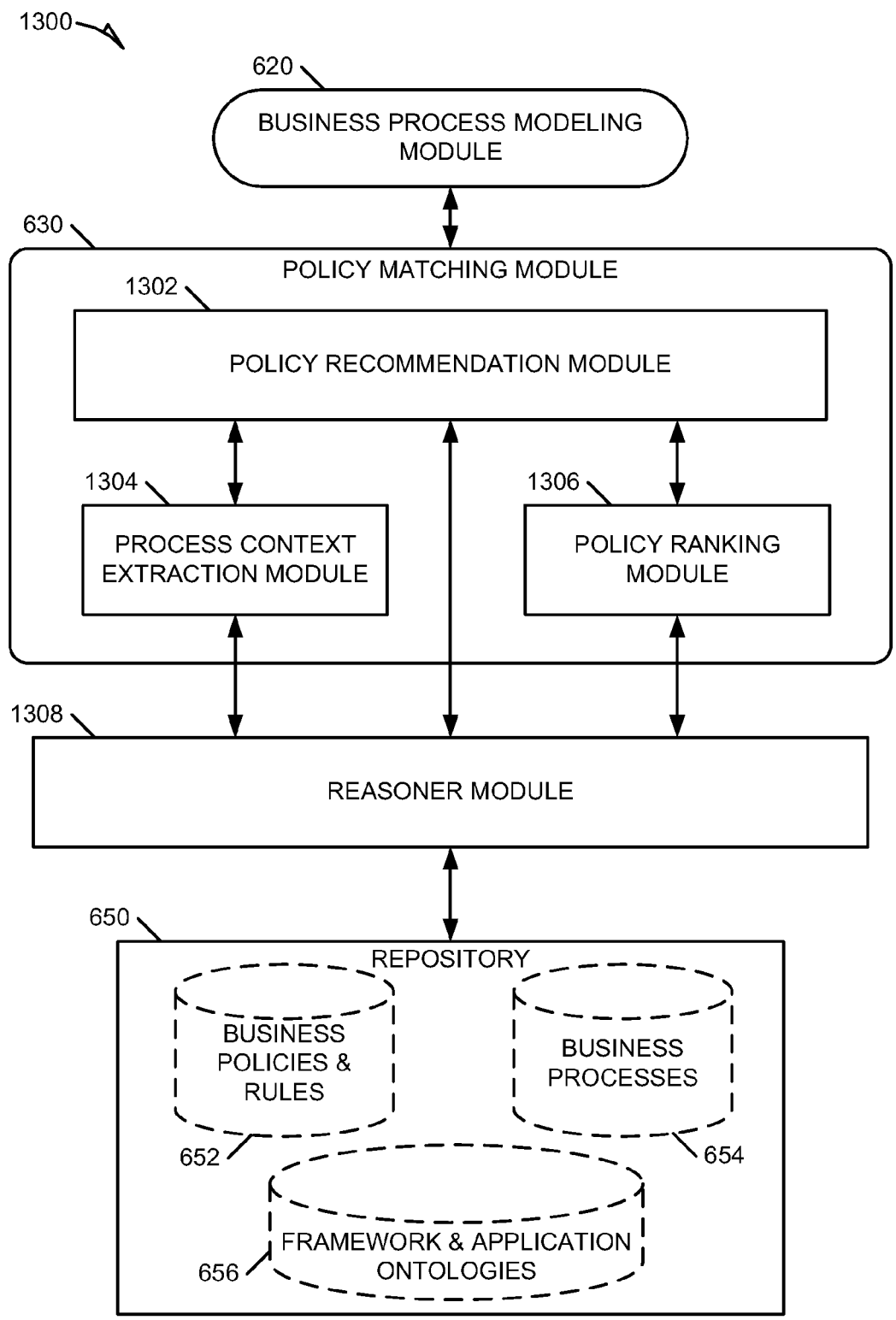
FIG. 13 is a block diagram illustrating a system for policy matching and ranking, according to an example embodiment.

FIG. 13 is a block diagram illustrating a system 1300 for policy matching and ranking, according to an example embodiment. The system 1300 can provide a context-based policy matching and ranking function, which can be used by the business process modeling engine 620. The system 1300 can include the business process modeling engine 620, the policy matching module 630, a reasoner module 1308, and the repository 650. In this example embodiment, the policy matching module 630 includes a policy recommendation module 1302, a process context extraction module 1304, and a policy ranking module 1306.

In this embodiment, the policy recommendation module 1302 coordinates providing a ranked list of policy recommendations based on the process model being developed within the business process modeling engine 620. The policy recommendation module 1302 works with the process context extraction module 1304 to extract a process context from the current process model. In this example, the process context extraction module 1304 interacts with the business process formalization module 624 (shown in FIG. 6) to obtain the formal representation of the current process being modeled. The policy ranking module 1306 is used to rank a list of relevant policies based on the matching algorithm discussed above. In certain examples, the policy ranking module 1306 performs ranking, in conjunction with the reasoner module 1308, by finding exact or relaxed matches.

The reasoner module 1308 can be used to assist in extracting the current process context, obtaining policies relevant to the current context, and ranking the list of relevant policies. The reasoner module 1308 is connected to the policy recommendation module 1302, the process context extraction module 1304, the policy ranking module 1306, and the repository 650.

Figure 14:
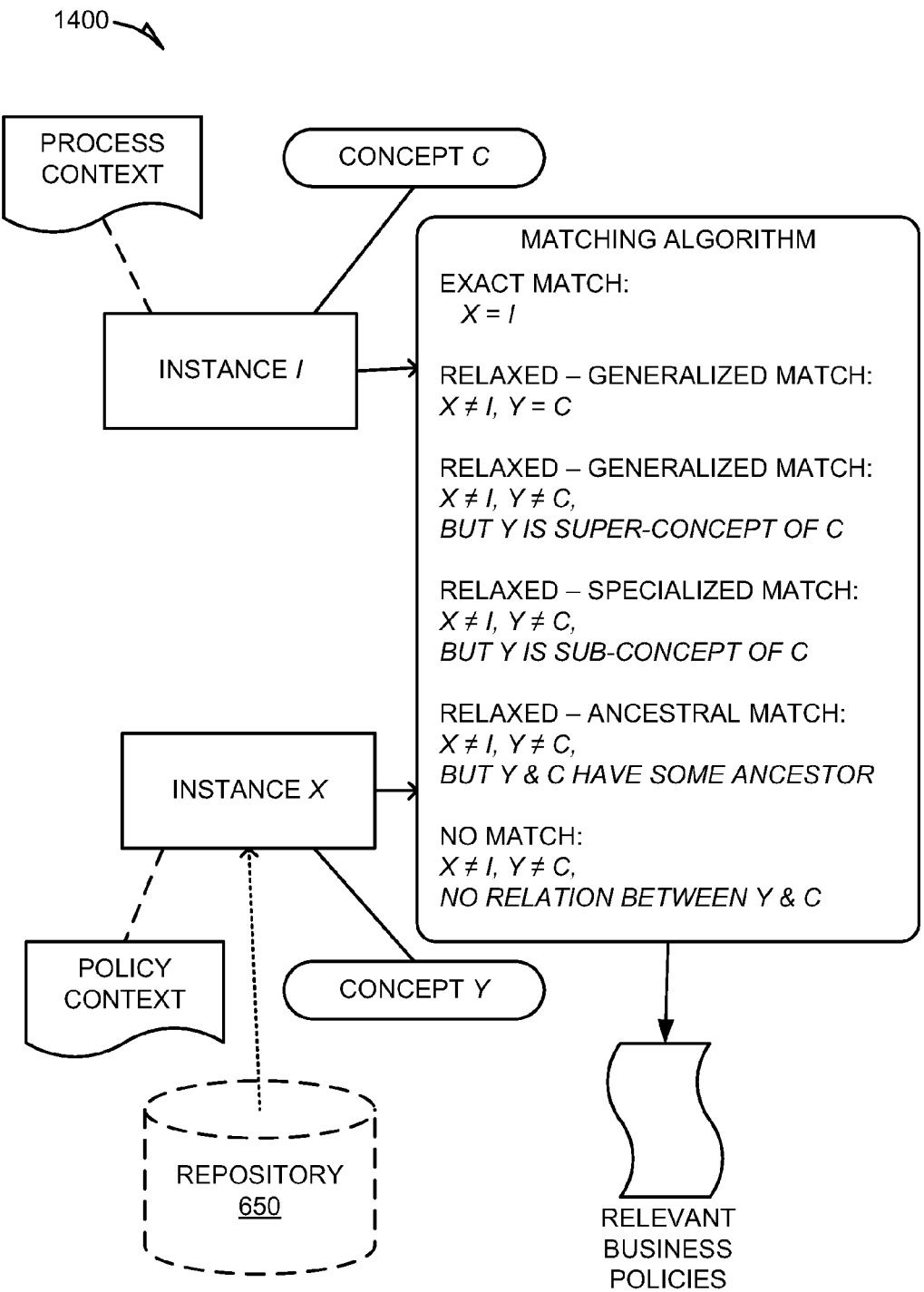
FIG. 14 is a block diagram illustrating an algorithm for matching policies to process models, according to an example embodiment.

FIG. 14 is a block diagram illustrating a matching algorithm 1400 for matching policies to process models, according to an example embodiment. The matching algorithm 1400 depicted in FIG. 14 can be implemented within the policy matching module 630. The matching algorithm 1400 uses three primary match types: exact match, relaxed match, and no match. An exact match occurs when the same instance is used in both policy and process context. A relaxed match includes three additional types of matches, discussed further below, which provide flexibility in the matching algorithm 1400. No match occurs if the instance of the process context does not find any matching instances in the policy context using exact or relaxed matches.

The relaxed matches can include a generalized match, a specialized match, and an ancestral match. A generalized match occurs in two potential ways. First, a generalized match occurs if an instance in the process context is matched to an instance of the same concept in the policy context. This is considered a relaxed match because the match does not occur at the instance level. Second, a generalized match occurs if a concept of the instance in the matched policy context is a generalization (e.g., super-concept) of a concept of the instance from the process context. A specialized match occurs if the concept of the instance in the matched policy context is a specialization (e.g., sub-concept) of the concept of the instance in the process context. Finally, an ancestral match occurs if the concept of the instances in the policy and process context shares a common ancestor in their concept hierarchy.

Business Process Modeling Methods

Figure 15:
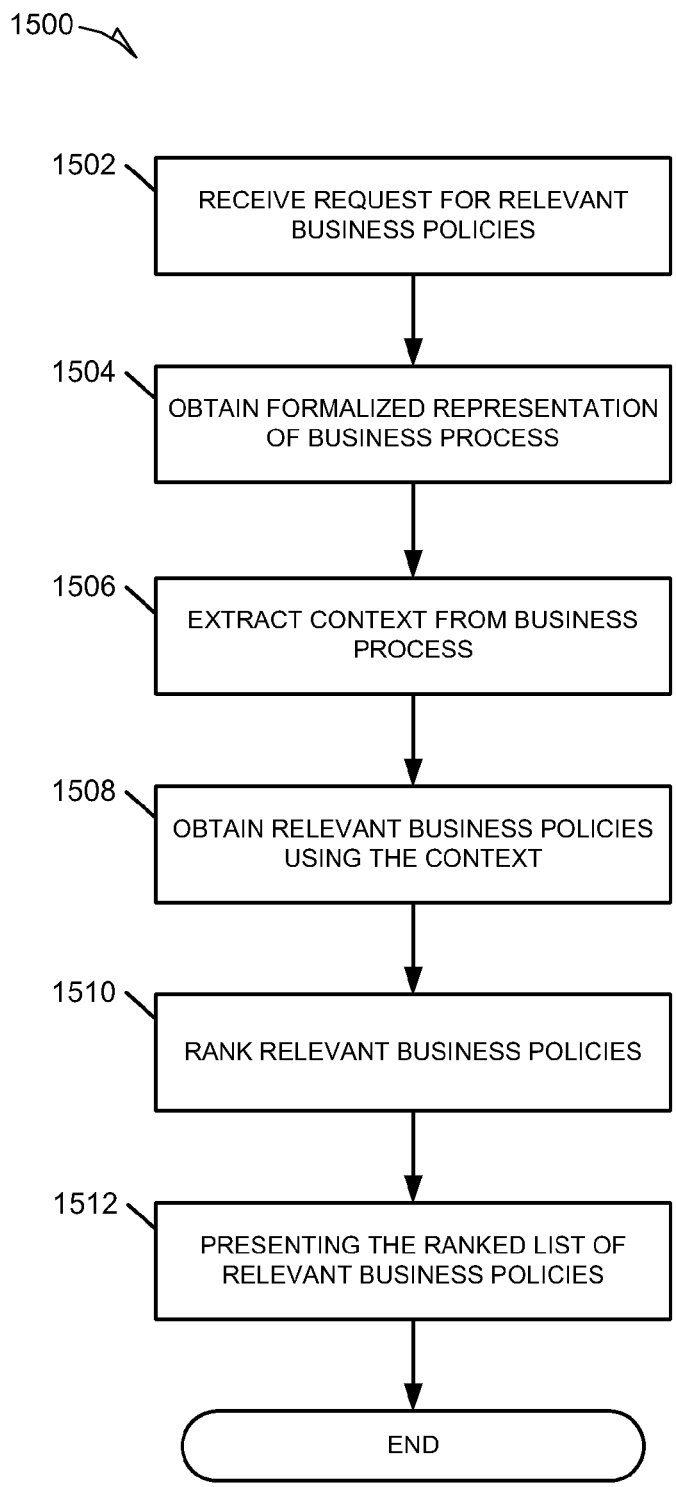
FIG. 15 is a flowchart illustrating a process for providing a list of relevant business policies, according to an example embodiment.

FIG. 15 is a flowchart illustrating a process method 1500 for providing a list of relevant business policies, according to an example embodiment. The method 1500 may be performed by processing logic that may comprise hardware (e.g., dedicated logic, programmable logic, microcode, etc.), software (such as executes on a general purpose computer system or a dedicated machine), or a combination of both. In an example embodiment, the processing logic resides within the policy matching module 630 and the reasoner module 1308 illustrated in FIG. 13. The method 1500 may be performed by the various modules discussed above with reference to FIG. 6, FIG. 10, and FIG. 13. Each of these modules may comprise processing logic.

As shown in FIG. 15, the method 1500 includes operations for receiving a request for relevant business policies, obtaining a formalized representation of the business process, extracting the context from the business process, obtaining relevant business policies using the context, ranking the relevant business policies, and presenting the ranked list of relevant business policies. The method 1500 commences at operation 1502 with the policy matching module 630 receiving a request for relevant business policies from the business process modeling engine 620. In an example, the policy recommendation module 1302 handles the incoming request from the business process modeling engine 620. The request for relevant business polices includes the current business process model being created within the business process modeling engine 620 as part of the input.

The method 1500 continues at operation 1504 with the policy recommendation module 1302 obtaining a formalized representation of the business process model. The formalized representation of the business process model allows the policy matching module 630 to extract matches from the enterprise meta-model in the repository 650. In an example, the formalized representation is obtained from the business process formalization module 624.

Next, the method 1500 moves to operation 1506 with the process context extraction module 1304 extracting the process context from the business process model. In certain examples, the process context extraction module 1304 works with the reasoner module 1308 to extract the process context. The reasoner module 1308 may query one of the ontologies stored in the repository 650 to obtain the process context information.

With the process context determined, the method 1500 continues at operation 1508 with the policy recommendation module 1302 obtaining matching business policies from the repository 650 using the reasoner module 1308. The process context is a data structure used to store contextual information about the business processes and policies. The process context may include process goals, process key performance indicators, resources consumed or produced by the process, business roles and organizational units involved in the process, functional areas of the enterprise in which the process is performed, among others. It is the contextual information that is used to obtain policies that the system considers relevant to the business process. The reasoner module 1308 uses the contextual information to make inferences about potential matching business policies. In an example, the inferencing performed by the reasoner module 1308 occurs at the instance level. The list of relevant business policies returned to the policy recommendation module 1302 in operation 1508 are not in any particular order of relevance.

The method 1500 continues at operation 1510 with the policy ranking module 1306 ranking the relevant business policies. In certain examples, the policy ranking module 1306 uses the matching algorithm 1400 illustrated in FIG. 14 to rank the relevant business policies.

Finally, the method 1500 concludes at operation 1512 with the business process modeling engine 620 presenting the ranked list of relevant business policies. In some examples, the returned list may only include a single policy. In another example, it is possible that no relevant business policies will be found and the business process modeling engine 620 will not present any results at operation 1512.

Figure 16:
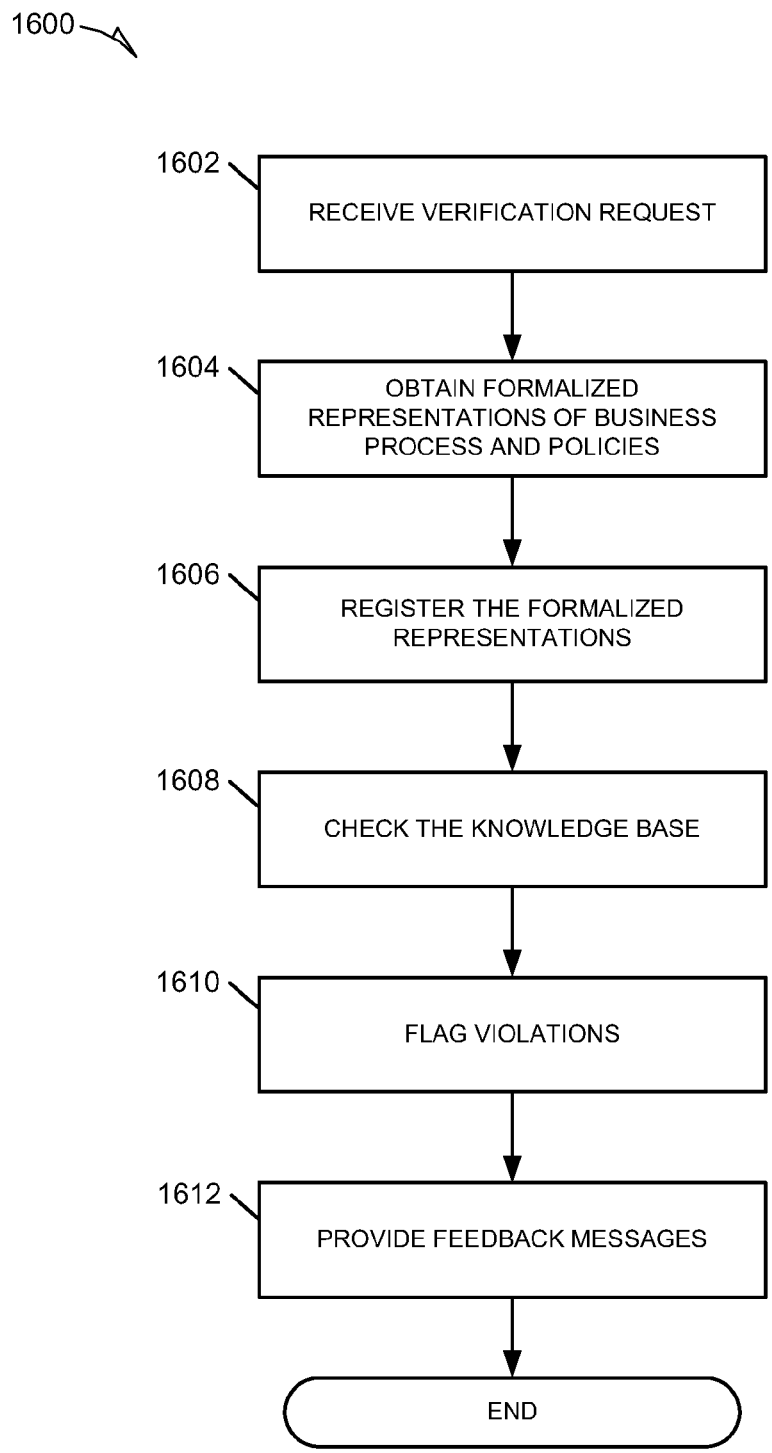
FIG. 16 is a flowchart illustrating a business process verification method, according to an example embodiment.

FIG. 16 is a flowchart illustrating a business process verification method, according to an example embodiment. The systems described above allow a process modeler to annotate business processes with business policies through semantic annotation. The method 1600 provides the process modeler with a method of validating the business process against the annotated business policies and the underlying business rules. The method 1600 may be performed by processing logic that may comprise hardware (e.g., dedicated logic, programmable logic, microcode, etc.), software (e.g., software executing on a general purpose computer system or a dedicated machine), or a combination of both. In an example embodiment, the processing logic resides within the validation module 640. The method 1600 may be performed by the various modules discussed above with reference to FIG. 6, and FIG. 9. Each of these modules may comprise processing logic.

As shown in FIG. 16, the method 1600 includes operations for receiving a verification request, obtaining a formalized representations of the business process and associated policies, register the formalized representations, checking the knowledge base, flagging any violations of underlying business rules, and providing feedback messages. The method 1600 begins at operation 1602 with the validation module 640 receiving a validation request from the business process modeling engine 620. The validation request includes a business process and at least one associated business policy to be validated.

At operation 1604, the method 1600 continues with the validation module 640 obtaining formalized representations of the business process and associated policies. In certain examples, the validation module accesses the business process formalization module 624 to obtain the formalized business process.

The method 1600 continues at operation 1606 with the validation module 640 registering the formalized representations with a reasoner 644 to create a knowledge base for this business process. At operation 1608, the reasoner 644 performs a consistency check on the knowledge base to look for constraint violations. If any of the business rules used to implement the associated business policies are violated, the consistency check fails and returns the violated business rule. At operation 1610 the method 1600 flags any of the violated business rules.

Finally, the method 1600 concludes at operation 1612 by providing feedback messages regarding flagged violations through the business process modeling engine 620. The feedback messages can be presented using the natural language description included within each business rule. If no business rules were found to be violated, the feedback messages can indicate the validity of the business process model.

Figure 17:
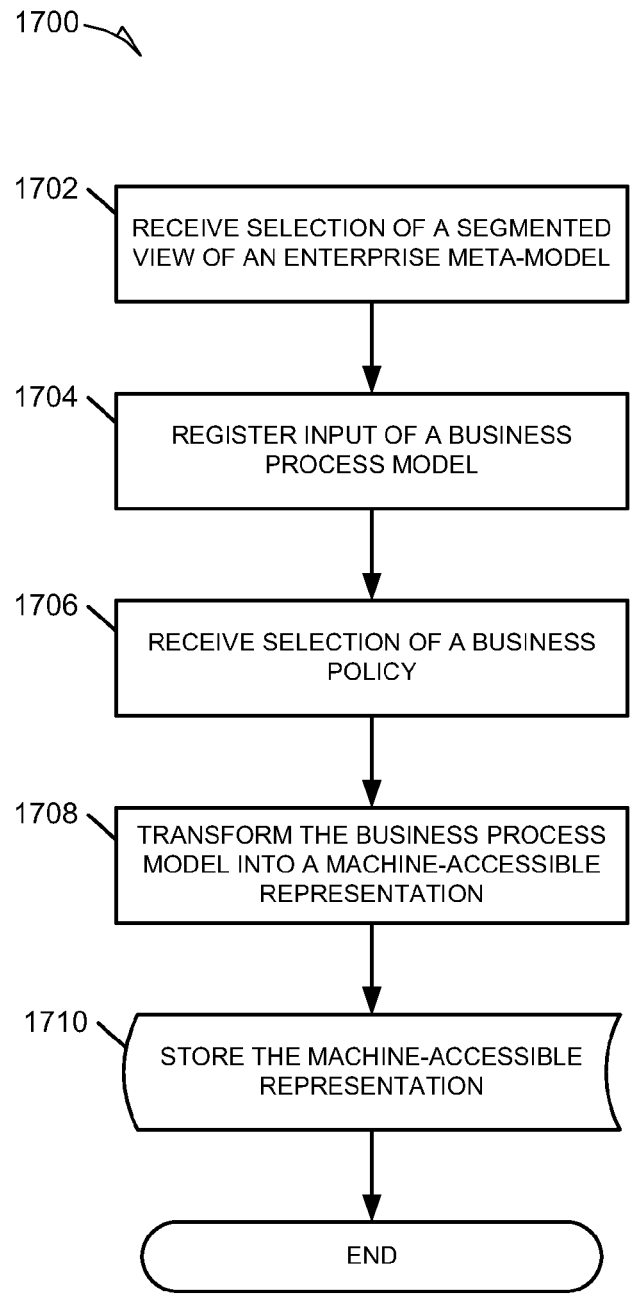
FIG. 17 is a flowchart illustrating a method of creating a machine-readable business process model using a segmented view of the enterprise, according to an example embodiment.

FIG. 17 is a flowchart illustrating a method 1700 of creating a machine-readable business process model using a segmented view of the enterprise, according to an example embodiment. The systems described above allow a process modeler to use process perspectives or role-based abstraction levels to limit or segment an enterprise meta-model to simplify the process of creating business process models. The method 1700 illustrates an example method of using the systems described above. The method 1700 may be performed by processing logic that may comprise hardware (e.g., dedicated logic, programmable logic, microcode, etc.), software (e.g., software executing on a general purpose computer system or a dedicated machine), or a combination of both. In an example embodiment, the processing logic resides within the business process modeling engine 620 illustrated in FIG. 6. The method 1700 may be performed by the various additional modules discussed above with reference to FIG. 6, FIG. 9-FIG. 11, and FIG. 13. Each of these modules may comprise processing logic.

As shown in FIG. 17, the method 1700 includes operations for receiving selection of a segmented view of an enterprise meta-model, registering input of a business process model, receiving selection of a business policy, transforming the business process model into a machine-readable representation, and storing the machine-readable representation. The method 1700 begins at operation 1702 with the business process modeling engine 620 receiving a process modeler's selection of a segmented view of the enterprise to be modeled. The segmented view can include a process-oriented perspective or a role-based abstraction level. In some examples, the selected segmented view can include both a process perspective and an abstraction level. As discussed in reference to FIG. 1, the process perspectives can include a functional view, a motivational view, an organizational view, a resource-oriented view, a compliance view, or a behavioural view. The role-based abstraction levels, also discussed above in reference to FIG. 1, can include different role-based views of the organization, such as an executive level view, a manager level view, or a business analyst level view. Combining process perspectives and abstraction levels allows the process modeler to focus on discrete portions of an organization when producing process models. The underlying enterprise meta-model allows the process modeler to keep the individual process models produced within the segmented views tied together and coordinated.

The method 1700 continues at operation 1704 with the business process modeling engine 620 registering input of a business process model. In an example, the process modeler can interact with the visual process modeling module 622 to create the desire process model. The visual process modeling module 622 can provide a set of visual modeling elements tailored to the selected segmented view of the enterprise. Limiting the available visual modeling elements based on the segmented view further assists in reducing modeling complexity by focusing the process modeler on only those functions relevant to the current modeling task.

Next, the method 1700 continues at operation 1706 with the business process modeling engine 620 receiving a selection of a business policy to annotate the business process currently being modeled. As discussed above, the system 600 can provide a list of matching business policies relevant to the current business process through a policy matching function implemented in the policy matching module 630. The policy matching function is described in detail in reference to FIG. 13 and FIG. 15 above. The selection of a business policy at operation 1706 includes selecting a business policy from a list of relevant business policies presented within the visual process modeling module 622. The process modeler is given an opportunity to select a relevant business policy to apply to the business process being modeled. The process modeler may choose to select zero or multiple business policies to annotate the current business process during this part of the process.

Once the process modeler has completed the modeling task, the method 1700 continues at operation 1708 with the business process modeling engine 620 transforming the business process model into a machine-readable representation (also referred to as an artifact). In an example, the transformation is accomplished by the business process formalization module 624 and involves converting the visually modeled business process into a formal machine-readable language. Converting the visual business process model into a formal machine-readable language allows the business process to be analyzed programmatically and added to the enterprise meta-model to ensure coordination with other processes throughout the organization. Finally, the method 1700 concludes at operation 1710 with the business process modeling engine 620 storing the machine-readable representation of the formalized business process into the repository 650.

Figure 18:
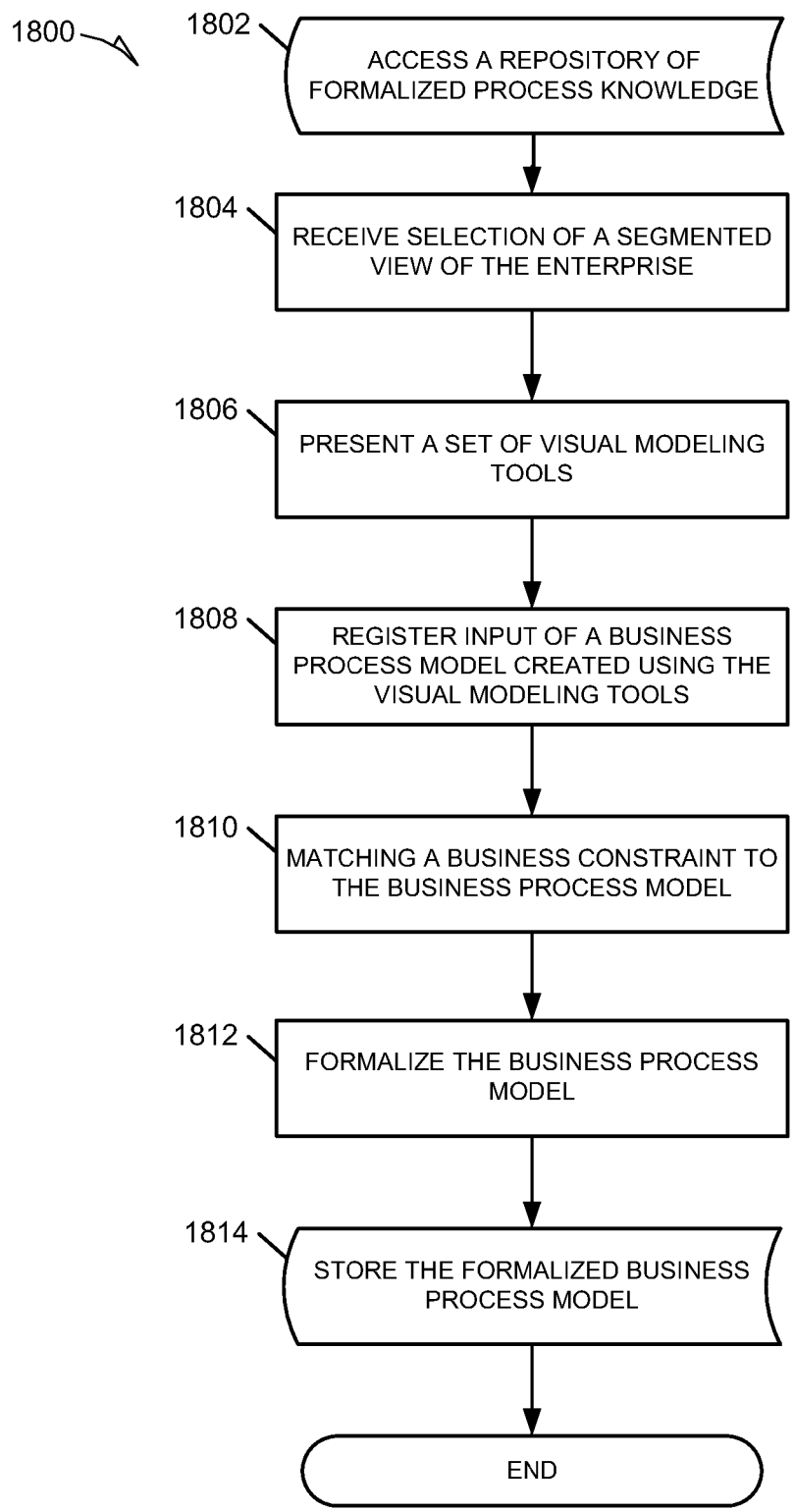
FIG. 18 is a flowchart illustrating a method of creating a formalized business process model using a segmented view of the enterprise, according to an example embodiment.

FIG. 18 is a flowchart illustrating a method 1800 of creating a formalized business process model using a segmented view of the enterprise, according to an example embodiment. The systems described above allow a process modeler to use process perspectives or role-based abstraction levels to limit or segment an enterprise meta-model to simplify the process of creating business process models. The method 1800 illustrates another example method of using the systems described above. The method 1800 may be performed by processing logic that may comprise hardware (e.g., dedicated logic, programmable logic, microcode, etc.), software (e.g., software executing on a general purpose computer system or a dedicated machine), or a combination of both. In an example embodiment, the processing logic resides within the business process modeling engine 620 illustrated in FIG. 6. The method 1800 may be performed by the various additional modules discussed above with reference to FIG. 6, FIG. 9-FIG. 11, and FIG. 13. Each of these modules may comprise processing logic.

As shown in FIG. 18, the method 1800 includes operations for accessing the repository 650 of formalized process knowledge, receiving selection of a segmented view of the enterprise, presenting a set of visual modeling tools, registering input of a business process model created using the visual modeling tools, matching a business constraint to the business process model, formalizing the business process model, and storing the formalized business process model. The method 1800 commences at operation 1802 with the business process modeling engine 620 accessing the repository 650 storing formalized process knowledge for the entire enterprise. In certain examples, the repository 650 includes a business policies and rules database 652, a business processes database 654, and a framework and application ontologies database 656. In some examples, the business polices and rules are stored within the repository 650 as formalized ontologies enabling computerized analysis and implementation of the business process models that use the formalized business policies and rules.

The method 1800 continues at operation 1804 with the business process modeling engine 620 receiving a selection of a segmented view of the enterprise within which the modeling will be performed. In this example, the process modeler selects a process perspective, an abstraction level, or both to segment or limit the current working paradigm. As discussed above, the visual process modeling module 622 can present the interface for selecting a process perspective or abstraction level.

The method 1800 continues at operation 1806 with the visual process modeling module 622 presenting a set of visual modeling tools. In this example, the set of visual process modeling tools presented by the visual process modeling module is limited by the selected segmented view of the enterprise.

At operation 1808, the process modeler uses the limited set of visual process modeling tools to input a business process model. In this example, the visual process modeling module 622 will register input of the business process model created using the visual process modeling tools.

With at least a portion of the business process model input into the visual process modeling module 622, the method 1800 can continue at operation 1810 by presenting business constraints that are relevant to the business process model. In an example, the policy matching module 630 provides a list of matching business rules (e.g., modeled in the form of constraints) that are relevant to the current business process being modeled within the business process modeling engine 620. In some examples, the matching process may also involve the validation module 640 as only business rules or policies that are valid to include in the current business process are presented to the process modeler. Annotation of the current business process can be performed manually by the process modeler or automatically by the business process modeling engine 620 based on the results provided by the policy matching module 630. In the case of automatic annotation, the business process modeling engine 620 can be configured to limit annotation to only those constraints that are exact matches, as discussed above in reference to FIG. 14.

Once the business process has been annotated with matching business constraints, the method 1800 continues at operation 1812 with the business process formalization module 624 formalizing the business process model. As discussed above, the formalization process produces a machine-readable version of the visually modeled business process model. The validation process described in reference to FIG. 16 may be invoked as part of the formalization process. The machine-readable version can be represented in a formal computer language (e.g., WSML-Flight) enabling automated analysis.

The method 1800 concludes by storing the formalized business process model in the repository 650. In this example, the business process modeling engine 620 communicates with the repository 650 to facilitate storing the formalized representation of the business process model.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiples of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

Electronic Apparatus and System

Example embodiments may be implemented in digital electronic circuitry, or in computer hardware, firmware, software, or in combinations of these. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 19:
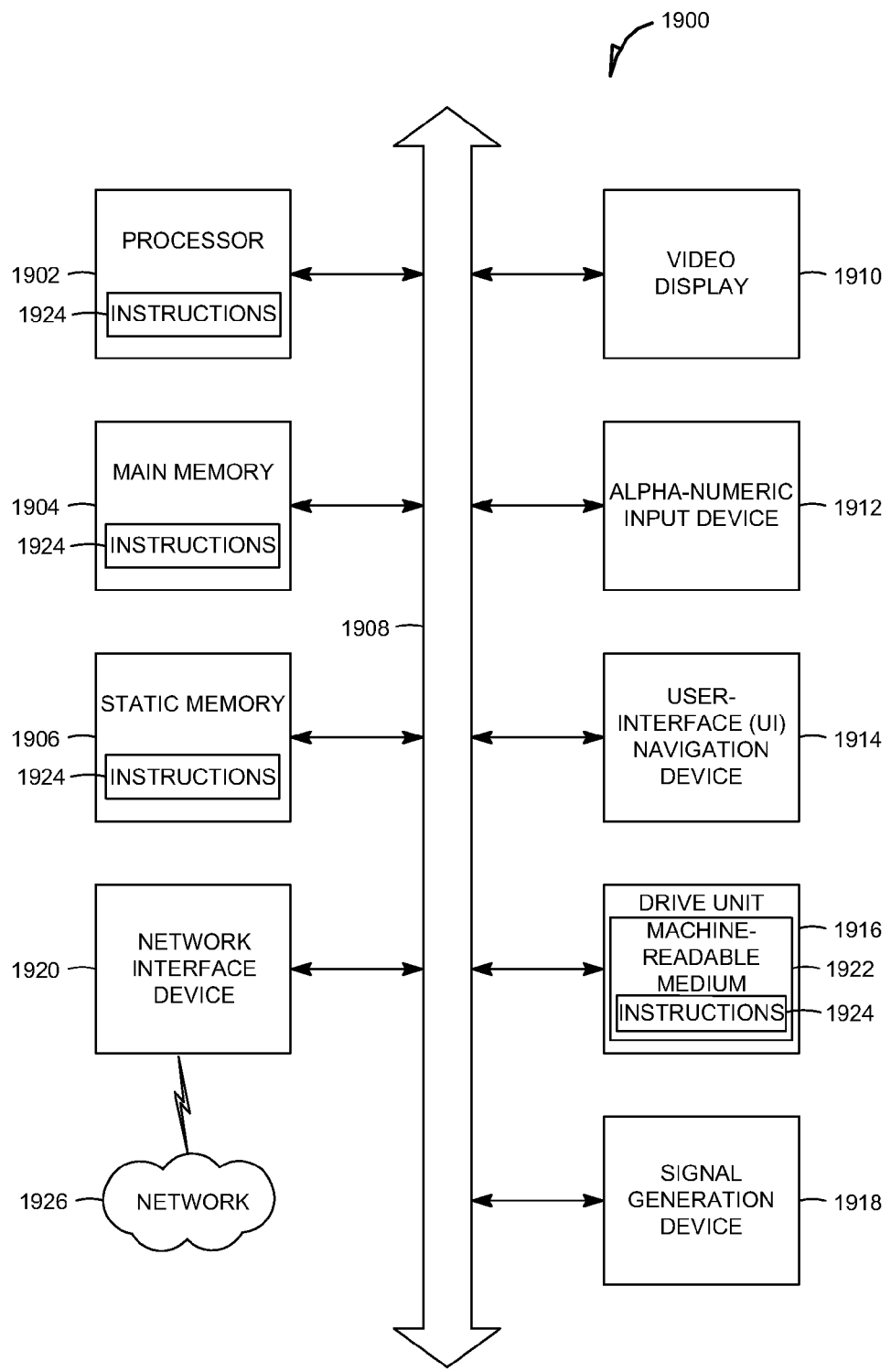
FIG. 19 is a block diagram of a machine in the example form of a computer system within which instructions for causing the machine to perform any one or more of the methodologies discussed herein, may be executed.

FIG. 19 is a block diagram of a machine in the example form of a computer system 1900 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1900 includes a processor 1902 (e.g., a central processing unit (CPU), a graphics processing unit (GPU) or both), a main memory 1904, and a static memory 1906, which communicate with each other via a bus 1908. The computer system 1900 may further include a video display unit 1910 (e.g., a liquid crystal display (LCD) or a cathode ray tube (CRT)). The computer system 1900 also includes an alphanumeric input device 1912 (e.g., a keyboard), a user interface (UI) navigation device 1914 (e.g., a mouse), a disk drive unit 1916, a signal generation device 1918 (e.g., a speaker) and a network interface device 1920.

Machine-Readable Medium

The disk drive unit 1916 includes a machine-readable medium 1922 on which is stored one or more sets of data structures and instructions (e.g., software) 1924 embodying or utilized by any one or more of the methodologies or functions described herein. The instructions 1924 may also reside, completely or at least partially, within the main memory 1904 and/or within the processor 1902 during execution thereof by the computer system 1900, the main memory 1904 and the processor 1902 also constituting machine-readable media.

While the machine-readable medium 1922 is shown in an example embodiment to be a single medium, the term "machine-readable medium" may include a single medium or multiple media (e.g., a centralized or distributed database, and/or associated caches and servers) that store the one or more data structures and instructions 1924. The term "machine-readable medium" shall also be taken to include any tangible medium that is capable of storing, encoding or carrying instructions for execution by the machine and that cause the machine to perform any one or more of the methodologies of the present embodiments of the invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1924 may further be transmitted or received over a communications network 1926 using a transmission medium. The instructions 1924 may be transmitted using the network interface device 1920 and any one of a number of well-known transfer protocols (e.g., HyperText Transfer Protocol (HTTP)). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Thus, a method and system for making contextual recommendations to users on a network-based marketplace have been described. Although the present embodiments of the invention have been described with reference to specific example embodiments, it will be evident that various modifications and changes may be made to these embodiments without departing from the broader spirit and scope of the embodiments of the invention. Accordingly, the specification and drawings are to be regarded in an illustrative rather than a restrictive sense.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method for modeling business processes for an enterprise, the method comprising:
    receiving selection of a segmented view of an enterprise meta-model, the segmented view depicting a discrete portion of a business process to be modeled, and the enterprise meta-model being a machine-readable representation of business rules and policies for the enterprise stored in a machine-readable enterprise meta-model repository;
    registering input of a business process model through arrangement of a set of visual modeling elements, the visual modeling elements limited by the segmented view depicting the discrete portion of the business process to be modeled and representing building blocks for the business process to be modeled;
    receiving selection of a business policy to apply to the business process model from a set of matching business policies associated with the business process model;
    transforming the business process model into a machine-readable representation of the business process model; and
    storing the machine-readable representation into the machine-readable enterprise meta-model repository.

2. The method of claim 1, wherein the receiving of the selection of the segmented view includes selecting at least one of a process perspective and a role-based abstraction.

3. The method of claim 2, wherein the process perspective represents at least one of a functional, motivational, organizational, resource, compliance, or behavioural process oriented views of the enterprise.

4. The method of claim 2, wherein the role-based abstraction includes an abstraction related to at least one of an executive, a manager, or a business analyst role within the enterprise.

5. The method of claim 1, wherein the transforming the business process model into a machine-readable representation includes validating the business process model against a business rule implementing the business policy to flag any constraint violations in the business process model.

6. The method of claim 5, wherein the validating the business process model includes running a consistency check on the business process model versus the business rule.

7. The method of claim 1, wherein the receiving selection of a business policy includes requesting matching business policies, the matching business policies having a relevance to the business process model.

8. The method of claim 7, wherein the requesting matching business policies includes:
- extracting a context front the business process model, the context contains information defining how the business process model fits into the enterprise meta model; and
- inferencing relevant business rules within the enterprise meta-model based on the context of the business process model.

9. A method for modeling a business process within an enterprise, the method comprising:
- accessing a repository of formalized process knowledge for the enterprise, including an enterprise ontology of business rules and business policies;
- receiving selection of a segmented view depicting a discrete portion of the enterprise to be modeled;
- presenting a set of visual modeling tools limited by the selected segmented view depicting a discrete portion of the enterprise to be modeled;
- registering input of a business process model created using the set of visual modeling tools;
- matching a business constraint to business process model, the business constraint having a pre-defined level of relevance to the business processes;
- formalizing the business process model; and
- storing the formalized business process model into the repository of formalized process knowledge for the enterprise.

10. The method of claim 9, wherein the receiving selection of a segmented view includes selecting at least one of a modeling perspective and an abstraction level, the modeling perspective representing a process-oriented view of the enterprise and the abstraction level representing a role-based view of the enterprise.

11. A system for modeling business processes for an enterprise, the system comprising:
- a repository to store an enterprise meta-model, the enterprise meta-model being a computer-accessible representation of business rules and policies for the enterprise; and
- a business process modeling engine including:
  - an input mechanism to receive selection of a segmented view of an enterprise meta-model, the segmented view depicting a discrete portion of a business process to be modeled and the enterprise meta-model;
  - a visual modeling module to present a set of visual modeling elements limited by the segmented view depicting the discrete portion of the business process to be modeled and register input of a business process model through selection, arrangement, and configuration of visual elements selected from the set of visual modeling elements;
  - a formalization module to transform the business process model into a machine-readable representation of the business process model; and
  - an output mechanism to store the machine-readable representation in the repository.

12. The system of claim 11, wherein the input mechanism of the business process modeling engine is to receive selection of the segmented view including selecting at least one of a process perspective and a role-based abstraction.

13. The system of claim 11, including a validation module to validate the business process model against a plurality of business rules included in the enterprise meta-model to flag any constraint violations in the business process model.

14. The system of claim 11, including a policy matching module to select a set of matching business policies from the enterprise meta-model that are relevant to the business process model.

15. The system of claim 14, wherein the policy matching module is to:
- extract a context from the business process model, the context contains information defining how the business process model fits into the enterprise meta-model; and
- infer relevant business policies stored within the enterprise meta-model using the context of the business process model.

16. A non-transitory machine-readable medium embodying instructions which, when executed by a computer-implemented system, cause the computer-implemented system to execute a method comprising:
- receiving selection of a segmented view of an enterprise meta-model, the segmented view depicting a discrete portion of a business process to be modeled, and the enterprise meta-model being a computer-accessible representation of business rules and policies for an enterprise stored in a computer-readable enterprise meta-model repository;
- registering input of a business process model through arrangement of a set of visual modeling elements, the visual modeling elements limited by the segmented view depicting the discrete portion of the business process to be modeled and representing building blocks for the business process to be modeled;
- receiving selection of a business policy to apply to the business process model from a set of matching business policies associated with the business process model;
- transforming the business process model into a machine-readable representation of the business process model; and
- storing the machine-readable representation into the computer-readable enterprise meta-model repository.

17. The non transitory machine-readable medium of claim 16, wherein, the receiving of the selection of the segmented view includes selecting at least one of a process perspective and a role-based abstraction.

18. The non-transitory machine-readable medium of claim 16, wherein the transforming of the business process model into a machine-readable representation includes validating the business process model against a business rule implementing the business policy to flag any constraint violations in the business process model.

19. The non-transitory machine-readable medium of claim 18, wherein the validating the business process model includes running a consistency check on the business process model versus the business rule.

20. The non-transitory machine-readable medium of claim 16, wherein selecting a business policy includes requesting matching business policies, the matching business policies having a relevance to the business process model.

21. The non-transitory machine-readable medium of claim 20, wherein the requesting matching business policies includes:
- extracting a context from the business process model, the context contains information defining how the business process modes fits into the enterprise meta-model; and
- inferencing relevant business rules within the enterprise meta-model based on the context of the business process model.

* * * * *